US012761747B2

(12) United States Patent
Oh et al.

(10) Patent No.: US 12,761,747 B2
(45) Date of Patent: Oct. 13, 2026

(54) TOUCH DRIVING CIRCUIT AND DISPLAY APPARATUS INCLUDING THE SAME

(71) Applicant: LG Display Co., Ltd., Seoul (KR)

(72) Inventors: JunSeok Oh, Paju-si (KR); Seunghyeon Kim, Paju-si (KR); SunBok Song, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 184 days.

(21) Appl. No.: 18/405,752

(22) Filed: Jan. 5, 2024

(65) Prior Publication Data

US 2024/0256073 A1 Aug. 1, 2024

(30) Foreign Application Priority Data

Jan. 31, 2023 (KR) ........................ 10-2023-0013306

(51) Int. Cl.
*G06F 3/01* (2006.01)
*G06F 3/041* (2006.01)

(52) U.S. Cl.
CPC ............ *G06F 3/0416* (2013.01); *G06F 3/016* (2013.01); *G06F 3/0412* (2013.01); *G06F 3/0414* (2013.01)

(58) Field of Classification Search
CPC ...... G06F 3/016; G06F 3/0412; G06F 3/0414; G06F 3/0416; G06F 3/044; G06F 2203/04105
See application file for complete search history.

(56) References Cited

U.S. PATENT DOCUMENTS

2011/0080349 A1* 4/2011 Holbein ................ G06F 1/3203 345/212
2017/0336902 A1* 11/2017 Smith ................... G06F 1/3203
2020/0241642 A1* 7/2020 Oh .......................... G06F 3/016

* cited by examiner

*Primary Examiner* — Sanghyuk Park
(74) *Attorney, Agent, or Firm* — Morgan, Lewis & Bockius LLP

(57) ABSTRACT

A touch driving circuit includes a touch sensing part configured to sense a touch, and a force sensing part configured to sense a force. Force sensing driving of the force sensing part is controlled based on a touch sensing signal of the touch sensing part.

32 Claims, 13 Drawing Sheets

TOUCH DRIVING CIRCUIT AND DISPLAY APPARATUS INCLUDING THE SAME

CROSS-REFERENCE TO RELATED APPLICATIONS

This application claims priority to Korean Patent Application No. 10-2023-0013306 filed in the Republic of Korea on Jan. 31, 2023, the entire contents of which is hereby expressly incorporated by reference into the present application.

BACKGROUND

Technical Field

The present disclosure relates to an apparatus and circuit, and particularly to, for example, without limitation, a touch driving circuit and a display apparatus including the same.

Discussion of the Related Art

As the information-oriented society advances, the demands for display apparatuses for displaying an image are variously increasing.

Electronic devices which use a display apparatus as a display screen provide a user interface of a touch screen type, for the convenience of a user input. Display apparatuses capable of touch interface processing have advanced to provide various functions.

In display apparatuses capable of touch interface processing, technology is being developed to include a force sensor for sensing a pressure (or a force) of a user touch input, in addition to a touch sensor which senses a position of the user touch input.

In display apparatuses, touch sensing driving and force sensing driving are continuously performed together for non-temporary touch sensing and/or force sensing by a user, and due to this, there is a problem where power consumption increases.

SUMMARY

Recently, haptic technology for providing a haptic feedback or a tactile feedback corresponding to a touch input when a user touches a screen of a display apparatus is being developed. A display apparatus to which the haptic technology is applied may generate an attractive force which stimulates a tango receptor of a human body, and thus, may stimulate a tactile sense of a user, thereby allowing the user to recognize a touch and/or a texture of the touch.

The inventors have performed various research and experiments on a touch driving circuit and a display apparatus including the same, which may provide a user with one or more of touch sensing, force sensing, and a haptic feedback when a user touch is applied thereto. Based on the various research and experiments, the inventors have invented a touch driving circuit and a display apparatus including the same, which may decrease power consumption and may provide a user with one or more of touch sensing, force sensing, and a haptic feedback.

Accordingly, aspects of the present disclosure are directed to a touch driving circuit and a display apparatus including the same that substantially obviates one or more of the problems due to limitations and disadvantages of the related art.

An aspect of the present disclosure is to provide a touch driving circuit and a display apparatus including the same, which may efficiently reduce the load and power consumption of a processor by touch sensing driving and force sensing driving.

Another aspect of the present disclosure is to provide a touch driving circuit and a display apparatus including the same, in which force sensing and a haptic feedback may be provided as one body.

Another aspect of the present disclosure is to provide a touch driving circuit and a display apparatus including the same, which may enhance touch driving performance including one or more of touch sensing, force sensing, and a haptic feedback.

Additional features and aspects will be set forth in the description that follows, and in part will be apparent from the description, or may be learned by practice of the inventive concepts provided herein. Other features and aspects of the inventive concepts may be realized and attained by the structure particularly pointed out in the written description, or derivable therefrom, and the claims hereof as well as the appended drawings.

To achieve these and other aspects of the inventive concepts, as embodied and broadly described herein, a touch driving circuit comprises a touch sensing part configured to sense a touch, and a force sensing part configured to sense a force. Force sensing driving of the force sensing part is controlled based on a touch sensing signal of the touch sensing part.

In another aspect, a touch driving circuit comprises a piezoelectric member including a piezoelectric material, a force sensing part connected with the piezoelectric member to sense a force based on a strain of the piezoelectric member, a vibration driver configured to generate a vibration driving signal which controls vibration generation driving of the piezoelectric member, and a controller configured to control the force sensing part and the vibration driver. The vibration generation driving of the vibration driver is controlled based on a force sensing signal of the force sensing part.

In another aspect, a display apparatus aspect comprises a display member configured to display an image and a touch driver connected with the display member. The touch driver includes a touch driving circuit. The touch driving circuit includes a touch sensing part configured to sense a touch, a force sensing part configured to sense a force, and a controller configured to control the touch sensing part and the force sensing part. Force sensing driving of the force sensing part is controlled based on a touch sensing signal of the touch sensing part.

In another aspect, a display apparatus comprises a display member configured to display an image and a touch driver connected with the display member. The touch driver includes a touch driving circuit. The touch driving circuit includes a piezoelectric member including a piezoelectric material, a force sensing part connected with the piezoelectric member to sense a force based on a strain of the piezoelectric member, a vibration driver configured to generate a vibration driving signal which controls vibration generation driving of the piezoelectric member, and a controller configured to control the force sensing part and the vibration driver. The vibration generation driving of the vibration driver is controlled based on a force sensing signal of the force sensing part.

According to one or more aspects of the present disclosure, a touch driving circuit and a display apparatus including the same, which may efficiently reduce the load and power consumption of a processor by touch sensing driving and force sensing driving, may be provided.

According to one or more aspects of the present disclosure, a touch driving circuit and a display apparatus including the same, in which force sensing and a haptic feedback may be provided as one body, may be provided.

According to one or more aspects of the present disclosure, a touch driving circuit and a display apparatus including the same, which may enhance touch driving performance including one or more of touch sensing, force sensing, and a haptic feedback, may be provided.

A touch driving circuit and a display apparatus including the same according to one or more aspects of the present disclosure may efficiently decrease the load and power consumption of a processor, and thus, low power may be implemented or realized and may be implemented or realized in a touch driving circuit where force sensing and a haptic feedback are provided as one body, thereby obtaining an effect of uni-materialization.

It is to be understood that both the foregoing general description and the following detailed description are exemplary and explanatory and are intended to provide further explanation of the inventive concepts as claimed.

BRIEF DESCRIPTION OF THE DRAWINGS

The accompanying drawings, which are included to provide a further understanding of the disclosure and are incorporated in and constitute a part of this application, illustrate aspects of the disclosure and together with the description serve to explain various principles of the disclosure.

Figure 1:
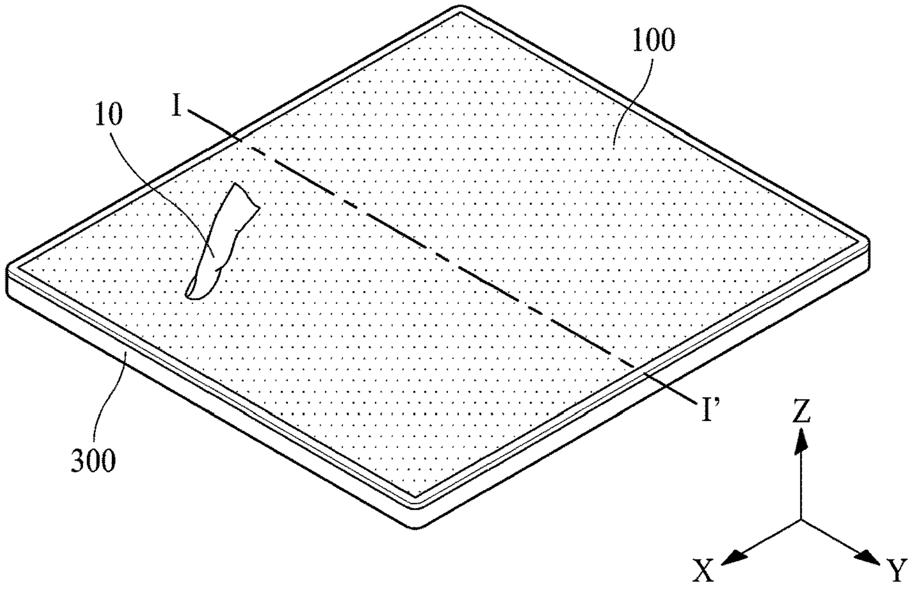
FIG. 1 is a perspective view illustrating a display apparatus according to an aspect of the present disclosure.

Throughout the drawings and the detailed description, unless otherwise described, the same drawing reference numerals should be understood to refer to the same elements, features, and structures. The sizes, lengths, and thicknesses of layers, regions and elements, and depiction of thereof can be exaggerated for clarity, illustration, and/or convenience.

DETAILED DESCRIPTION

Reference is now made in detail to aspects of the present disclosure, examples of which can be illustrated in the accompanying drawings. In the following description, when a detailed description of well-known functions, structures or configurations can unnecessarily obscure aspects of the present disclosure, the detailed description thereof may have been omitted for brevity or briefly discussed. Further, repetitive descriptions may be omitted for brevity. The progression of processing steps and/or operations described is an example.

The sequence of steps and/or operations is not limited to that set forth herein and may be changed to occur in an order that is different from an order described herein, with the exception of steps and/or operations necessarily occurring in a particular order. In one or more examples, two operations in succession may be performed substantially concurrently, or the two operations may be performed in a reverse order or in a different order depending on a function or operation involved.

Unless stated otherwise, like reference numerals may refer to like elements throughout even when they are shown in different drawings. In one or more aspects, identical elements (or elements with identical names) in different drawings may have the same or substantially the same functions and properties unless stated otherwise. Names of the respective elements used in the following explanations are selected only for convenience and may be thus different from those used in actual products.

Advantages and features of the present disclosure, and implementation methods thereof, are clarified through the aspects described with reference to the accompanying drawings. The present disclosure can, however, be embodied in different forms and should not be construed as limited to the aspects set forth herein. Rather, these aspects are examples and are provided so that this disclosure can be thorough and complete, to assist those skilled in the art to understand the inventive concepts without limiting the protected scope of the present disclosure.

Shapes (e.g., sizes, dimensions, lengths, widths, heights, thicknesses, locations, radii, diameters, and areas), ratios, angles, numbers, and the like disclosed herein, including those illustrated in the drawings are merely examples, and thus, the present disclosure is not limited to the illustrated details. Any implementation described herein as an "example" is not necessarily to be construed as preferred or advantageous over other implementations. It is, however, noted that the relative dimensions of the components illustrated in the drawings are part of the present disclosure.

When the term "comprise," "have," "include," "contain," "constitute," "made of," "formed of," or the like is used with respect to one or more elements, one or more other elements may be added unless a term such as "only" or the like is used. The terms used in the present disclosure are merely used in order to describe example aspects, and are not intended to limit the scope of the present disclosure. The terms of a singular form may include plural forms unless the context clearly indicates otherwise.

The word "exemplary" is used to mean serving as an example or illustration. Aspects are example aspects. "Aspects," "examples," "aspects," and the like should not be construed as preferred or advantageous over other implementations. An aspect, an example, an example aspect, an aspect, or the like may refer to one or more aspects, one or more examples, one or more example aspects, one or more aspects, or the like, unless stated otherwise. Further, the term "may" encompasses all the meanings of the term "can."

In one or more aspects, unless explicitly stated otherwise, element, feature, or corresponding information (e.g., a level, range, dimension, size, or the like) is construed to include an error or tolerance range even where no explicit description of such an error or tolerance range is provided. An error or tolerance range may be caused by various factors (e.g., process factors, internal or external impact, noise, or the like). In interpreting a numerical value, the value is interpreted as including an error range unless explicitly stated otherwise.

In describing a positional relationship, when the positional relationship between two parts (e.g., layers, films, regions, components, sections, or the like) is described, for example, using "on," "upon," "on top of," "over," "under," "above," "below," "beneath," "near," "close to," "adjacent to," "beside," "next to," "at or on a side of," or the like, one or more parts may be located between two other parts unless a more limiting term, such as "immediate(ly)," "direct(ly)," or "close(ly)," is used. For example, when a structure is described as being positioned "on," "upon," "on top of," "over," "under," "above," "below," "beneath," "near," "close to," "adjacent to," "beside," "next to," "at or on a side of," or the like another structure, this description should be construed as including a case in which the structures contact each other as well as a case in which one or more additional structures are disposed or interposed therebetween. Furthermore, the terms "front," "rear," "back," "left," "right," "top," "bottom," "downward," "upward," "upper," "lower," "up," "down," "column," "row," "vertical," "horizontal," and the like refer to an arbitrary frame of reference.

Spatially relative terms, such as "below," "beneath," "lower," "on," "above," "upper" and the like, can be used to describe a correlation between various elements (e.g., layers, films, regions, components, sections, or the like) as shown in the drawings. The spatially relative terms are to be understood as terms including different orientations of the elements in use or in operation in addition to the orientation depicted in the drawings. For example, if the elements shown in the drawings are turned over, elements described as "below" or "beneath" other elements would be oriented "above" other elements. Thus, the term "below," which is an example term, can include all directions of "above" and "below." Likewise, an exemplary term "above" or "on" can include both directions of "above" and "below."

In describing a temporal relationship, when the temporal order is described as "after," "subsequent," "next," "before," "preceding," "prior to," or the like a case which is not consecutive or not sequential may be included and thus one or more other events may occur therebetween, unless a more limiting term, such as "just," "immediate(ly)," or "direct (ly)" is used.

The terms, such as "below," "lower," "above," "upper" and the like, may be used herein to describe a relationship between element(s) as illustrated in the drawings. It will be understood that the terms are spatially relative and based on the orientation depicted in the drawings.

It is understood that, although the terms "first", "second," or the like may be used herein to describe various elements (e.g., layers, films, regions, components, sections, or the like), these elements should not be limited by these terms, for example, to any particular order, sequence, precedence, or number of elements. These terms are used only to identify one element from another. For example, a first element could be a second element, and, similarly, a second element could be a first element, without departing from the scope of the present disclosure. Furthermore, the first element, the second element, and the like may be arbitrarily named according to the convenience of those skilled in the art without departing from the scope of the present disclosure. For clarity, the functions or structures of these elements (e.g., the first element, the second element and the like) are not limited by ordinal numbers or the names in front of the elements. Further, a first element may include one or more first elements. Similarly, a second element or the like may include one or more second elements or the like.

In describing elements of the present disclosure, the terms "first," "second," "A," "B," "(a)," "(b)," or the like may be used. These terms are intended to identify the corresponding element(s) from the other element(s), and these are not used to define the essence, basis, order, or number of the elements.

For the expression that an element (e.g., layer, film, region, component, section, or the like) is "connected," "coupled," "attached," "adhered," or the like to another element, the element can not only be directly connected, coupled, attached, adhered, or the like to another element, but also be indirectly connected, coupled, attached, adhered, or the like to another element with one or more intervening elements disposed or interposed between the elements, unless otherwise specified.

For the expression that an element (e.g., layer, film, region, component, section, or the like) is "contacts," "overlaps," or the like with another element, the element can not only directly contact, overlap, or the like with another element, but also indirectly contact, overlap, or the like with another element with one or more intervening elements disposed or interposed between the elements, unless otherwise specified.

The phase that an element (e.g., layer, film, region, component, section, or the like) is "provided in," "disposed in," or the like in another element may be understood as that at least a portion of the element is provided in, disposed in, or the like in another element, or that the entirety of the element is provided in, disposed in, or the like in another element. The phase that an element (e.g., layer, film, region, component, section, or the like) "contacts," "overlaps," or the like with another element may be understood as that at least a portion of the element contacts, overlaps, or the like with a least a portion of another element, that the entirety of the element contacts, overlaps, or the like with a least a portion of another element, or that at least a portion of the element contacts, overlaps, or the like with the entirety of another element.

The terms such as a "line" or "direction" should not be interpreted only based on a geometrical relationship in which the respective lines or directions are parallel or perpendicular to each other, and may be meant as lines or directions having wider directivities within the range within which the components of the present disclosure can operate functionally. For example, the terms "first direction," "second direction," and the like, such as a direction parallel or perpendicular to "x-axis," "y-axis," or "z-axis," should not be interpreted only based on a geometrical relationship in which the respective directions are parallel or perpendicular to each other, and may be meant as directions having wider directivities within the range within which the components of the present disclosure can operate functionally.

The term "at least one" should be understood as including any and all combinations of one or more of the associated listed items. For example, each of the phrases of "at least one of a first item, a second item, or a third item" and "at least one of a first item, a second item, and a third item" may represent (i) a combination of items provided by two or more of the first item, the second item, and the third item or (ii) only one of the first item, the second item, or the third item.

The expression of a first element, a second elements "and/or" a third element should be understood as one of the first, second and third elements or as any or all combinations of the first, second and third elements. By way of example, A, B and/or C can refer to only A; only B; only C; any of A, B, and C (e.g., A, B, or C); or some or some combination of A, B, and C (e.g., A and B; A and C; or B and C); or all of A, B, and C. Furthermore, an expression "A/B" may be understood as A and/or B. For example, an expression "A/B" can refer to only A; only B; A or B; or A and B.

In one or more aspects, the terms "between" and "among" may be used interchangeably simply for convenience unless stated otherwise. For example, an expression "between a plurality of elements" may be understood as among a plurality of elements. In another example, an expression "among a plurality of elements" may be understood as between a plurality of elements. In one or more examples, the number of elements may be two. In one or more examples, the number of elements may be more than two. Furthermore, when an element (e.g., layer, film, region, component, sections, or the like) is referred to as being "between" at least two elements, the element may be the only element between the at least two elements, or one or more intervening elements may also be present.

In one or more aspects, the phrases "each other" and "one another" may be used interchangeably simply for convenience unless stated otherwise. For example, an expression "different from each other" may be understood as being different from one another. In another example, an expression "different from one another" may be understood as being different from each other. In one or more examples, the number of elements involved in the foregoing expression may be two. In one or more examples, the number of elements involved in the foregoing expression may be more than two.

In one or more aspects, the phrases "one or more among" and "one or more of" may be used interchangeably simply for convenience unless stated otherwise.

The term "or" means "inclusive or" rather than "exclusive or." That is, unless otherwise stated or clear from the context, the expression that "x uses a or b" means any one of natural inclusive permutations. For example, "a or b" may mean "a," "b," or "a and b." For example, "a, b or c" may mean "a," "b," "c," "a and b," "b and c," "a and c," or "a, b and c."

Features of various aspects of the present disclosure may be partially or entirety coupled to or combined with each other, may be technically associated with each other, and may be variously inter-operated, linked or driven together. The aspects of the present disclosure may be implemented or carried out independently of each other, or may be implemented or carried out together in a co-dependent or related relationship. In one or more aspects, the components of each apparatus according to various aspects of the present disclosure are operatively coupled and configured.

Unless otherwise defined, the terms (including technical and scientific terms) used herein have the same meaning as commonly understood by one of ordinary skill in the art to which example aspects belong. It is further understood that terms, such as those defined in commonly used dictionaries, should be interpreted as having a meaning that is, for example, consistent with their meaning in the context of the relevant art and should not be interpreted in an idealized or overly formal sense unless expressly defined otherwise herein.

The terms used herein have been selected as being general in the related technical field; however, there may be other terms depending on the development and/or change of technology, convention, preference of technicians, and so on. Therefore, the terms used herein should not be understood as limiting technical ideas, but should be understood as examples of the terms for describing example aspects.

Further, in a specific case, a term may be arbitrarily selected by an applicant, and in this case, the detailed meaning thereof is described herein. Therefore, the terms used herein should be understood based on not only the name of the terms, but also the meaning of the terms and the content hereof.

In the present disclosure, examples of a "display apparatus" may include a narrow-sense display apparatus such as a display module (e.g., quantum dot module, an organic light emitting diode (OLED) module or a liquid crystal module (LCM)) including a display panel and a driver for driving the display panel. Also, examples of the display module may include a set device (or a set apparatus) or a set electronic device such as a notebook computer or a laptop computer, a television (TV), a computer monitor, an equipment apparatus including an automotive apparatus or another type apparatus for vehicles, or a mobile electronic device such as a smartphone or an electronic pad, which is a complete product (or a final product) including a display module such as a liquid crystal display module or a light emitting display module (for example, an organic light emitting display module or inorganic light emitting display module).

Therefore, in the present disclosure, examples of a display apparatus may include a display apparatus itself, such as a liquid crystal display module or an organic light emitting display module, and a set device which is a final consumer device or an application product including a liquid crystal display module or an organic light emitting display module.

A display panel used in one or more aspects of the present disclosure may use all types of display panels such as a liquid crystal display panel, an organic light emitting display panel, a mini light emitting diode display panel, and a micro light emitting diode display panel, but aspects of the present disclosure are not limited thereto. For example, a display panel may be a display panel which may sense a touch or pressure (or force) of a user by a sensor driving circuit according to an aspect of the present disclosure. Also, a shape or a size of a display panel applied to a display apparatus according to an aspect of the present disclosure is not limited.

According to one or more aspects of the present disclosure, when a display panel is a liquid crystal display panel, the display panel may include a plurality of gate lines, a plurality of data lines, and a plurality of pixels provided in a plurality of pixel areas defined by intersections of the plurality of gate lines and the plurality of data lines. Also, the display panel may include a first substrate including a thin film transistor (TFT) which is a switching element for adjusting a light transmittance in each of the plurality of pixels, a second substrate including a color filter and/or a black matrix, and a liquid crystal layer between the first substrate and the second substrate.

When a display panel is an organic light emitting display panel, the display panel may include a plurality of gate lines, a plurality of data lines, and a plurality of pixels respectively provided in a plurality of pixel areas defined by intersections of the plurality of gate lines and the plurality of data lines. Also, the display panel may include a substrate including a TFT which is an element for selectively applying a voltage to each of the pixels, an organic light emitting device layer on the substrate, and an encapsulation layer (or an encapsulation substrate) disposed on the substrate to cover the organic light emitting device layer. The encapsulation substrate may protect the TFT and the organic light emitting device layer from an external impact and may prevent water or oxygen from penetrating into the organic light emitting device layer. Also, the display panel may include an inorganic light emitting layer (for example, a nano-sized material layer and/or a quantum dot emission layer). As another example, the organic light emitting device layer may be replaced with a micro light emitting diode or a mini light emitting diode.

In present disclosure, a display apparatus including a vibration apparatus may be implemented with a user interface device such as a central control panel in automobiles, and thus, may be applied to vehicles.

Features of various aspects of the present disclosure may be partially or overall coupled to or combined with each other, and may be variously inter-operated with each other and driven technically as those skilled in the art can sufficiently understand. The aspects of the present disclosure may be carried out independently from each other, or may be carried out together in co-dependent relationship.

In the following description, various example aspects of the present disclosure are described in detail with reference to the accompanying drawings. With respect to reference numerals to elements of each of the drawings, the same elements may be illustrated in other drawings, and like reference numerals may refer to like elements unless stated otherwise. The same or similar elements may be denoted by the same reference numerals even though they are depicted in different drawings. In addition, for convenience of description, a scale, dimension, size, and thickness of each of the elements illustrated in the accompanying drawings may be different from an actual scale, dimension, size, and thickness, and thus, aspects of the present disclosure are not limited to a scale, dimension, size, and thickness illustrated in the drawings.

Figure 2:
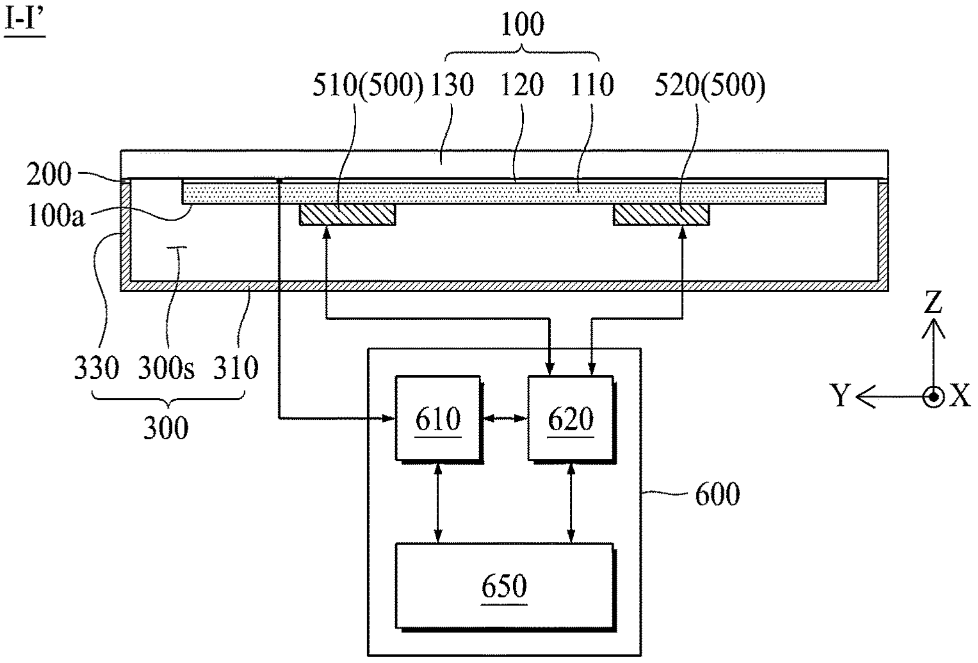
FIG. 2 illustrates a touch driving circuit and a cross-sectional surface taken along line I-I' illustrated in FIG. 1 according to an aspect of the present disclosure.

FIG. 1 is a perspective view illustrating a display apparatus according to an aspect of the present disclosure. FIG. 2 illustrates a touch driving circuit and a cross-sectional surface taken along line I-I' illustrated in FIG. 1 according to an aspect of the present disclosure.

Referring to FIGS. 1 and 2, the display apparatus according to an aspect of the present disclosure may be configured to sense one or more of a finger touch based on a finger 10 and a touch based on a touch pen (for example, a stylus pen). For example, the display apparatus according to an aspect of the present disclosure may be a display apparatus to which a touch panel is added or a display apparatus with a touch screen integrated therein. For example, the display apparatus according to an aspect of the present disclosure may be used as a mobile electronic device, such as a mobile phone, a smartphone, a smart glass, a wearable device, a smart watch, a personal digital assistants (PDA), a portable multimedia player (PMP), a navigator, a tablet personal computer (PC), or a watch phone, or a display apparatus such as a smart television (TV), an electronic bulletin board, a bidirectional information transfer transparent display, a (e.g., bidirectional) digital signage, a notebook computer, a monitor, a set-top box (STB), a DMB receiver, a radio, a washing machine, a robot, a vehicle, or a refrigerator, but aspects of the present disclosure are not limited thereto.

The display apparatus according to an aspect of the present disclosure may include a display member 100 and a touch driving circuit 600.

The display member 100 may be configured to display an image and may provide a user interface (e.g., a screen or a panel) which senses a touch or pressure (or force) of a user to recognize a user input.

The display member 100 may include a display panel 110, a touch panel 120, and one or more piezoelectric members 500, but is not limited thereto.

The display panel 110 may be configured to display an image. For example, the display panel 110 may include a plurality of pixels which are configured to display an image. The image may include an electronic (e.g., analog) image, a digital image, a still image, or a video image. For example, the display panel 110 may include an organic light emitting display panel including a plurality of pixels displaying a black or color image, but the kind of display panel is not limited thereto. For example, the display panel 110 may include a liquid crystal display panel, an electrophoresis display panel, a field emission display (FED) panel, a micro light emitting diode display panel, a mini light emitting diode display panel, an electro-wetting display panel, or a quantum dot light emitting display panel. Hereinafter, an example where the display panel 10 is an organic light emitting display panel will be described, but aspects of the present disclosure are not limited thereto.

For example, the organic light emitting display panel may include at least a base substrate, a display part, and a plate member.

The base substrate may include one or more of a glass material and a plastic material, but aspects of the present disclosure are not limited thereto. For example, as the plastic substrate, polyimide (PI), polyethylene terephthalate (PET), acrylonitrile-butadiene-styrene copolymer (ABS), polymethyl methacrylate (PMMA), polyethylene naphthalate (PEN), polycarbonate (PC), polyethersulfone (PES), polyarylate (PAR), polysulfone (PSF), cyclic olefin copolymer (COC), triacetylcellulose (TAC) film, polyvinyl alcohol (PVA) film, and polystyrene (PS) may be used, but is not limited thereto. The display part may include a pixel array part including a plurality of pixels provided in a plurality of pixel areas defined by a plurality of gate lines and/or a plurality of data lines. Each of the plurality of pixels may include an (e.g., organic) emission layer. The plate member may be configured to cover the display part. The plate member may be attached on the display part by an adhesive member such as double-sided tape, a single-sided tape, an adhesive, or a bond. The plate member may protect the display part or the display panel foreign matters such as from an external impact and may prevent external water or moisture from penetrating into a self-emitting device layer.

The display panel 110 according to an aspect of the present disclosure may further include an encapsulation layer. The encapsulation layer may be configured between the display part and the adhesive member to directly surround the display part. The encapsulation layer may be configured to prevent foreign matters such as external water or moisture from penetrating into the light emitting device layer. The encapsulation layer may be provided as an inorganic material layer or an organic material layer, or may be formed in a structure where an inorganic material layer and an organic material layer are alternately stacked, but aspects of the present disclosure are not limited thereto. The inorganic encapsulation layer may be made of an inorganic material such as silicon oxide (SiOx) or silicon nitride (SiNx). The organic encapsulation layer may be made of an organic material such as acrylic resin, epoxy resin, phenolic resin, polyamide resin, and polyimide resin. Materials of the inorganic encapsulation layer and the inorganic encapsulation layer are not limited thereto. For example, the encapsulation layer may be omitted based on a structure of the display panel.

The touch panel (or a touch screen) 120 may be configured to sense a user touch applied to the display member 100. For example, the touch panel 120 may be configured to sense a user touch based on the touch pen or the finger 10. The touch panel 120 may be configured to be connected with the display panel 110. For example, the display panel 110 may be an organic light emitting display panel with a touch screen integrated therein, but is not limited thereto. For example, the display panel 110 may also be a liquid crystal display panel with a touch screen integrated therein.

The touch panel 120 according to an aspect of the present disclosure may be configured to cover a front surface of the display panel 110. The touch panel 120 and the display panel 110 may be separately manufactured and/or may be combined, which may be called an add-on touch panel. Alternatively, elements constituting the touch panel may be formed directly on the surface of the upper substrate of a display device, which may be called an on-cell type touch panel. For example, the touch panel 120 may be disposed to cover a front surface of the plate member or a front surface of the base substrate of the display panel 110.

According to another aspect of the present disclosure, the touch panel 120 may be provided between the display part and the plate member of the display panel 110, but aspects of the present disclosure are not limited thereto. For example, the touch panel 120 may be disposed in the pixel array part of the display panel 110, and in this case, the touch panel 120 may be an in-cell touch panel, a touch electrode layer, or a touch sensor layer, but aspects of the present disclosure are not limited thereto. For example, the touch panel 120 may include an electrode structure corresponding to a mutual-capacitance type, which is configured so that a plurality of touch driving electrodes which receive a touch synchronization signal from the touch driving circuit 600 intersect or overlap with a plurality of touch sensing electrodes which may provide a readout signal indicating a variation in mutual capacitance between the driving electrode and the sensing electrode, which is generated due to a touch, to the touch driving circuit 600, or a self-capacitance type which is configured with only a plurality of touch sensing electrodes which may receive a touch synchronization signal from the touch driving circuit 600 and may provide a readout signal indicating a variation in self-capacitance generated due to a touch to the touch driving circuit 600.

According to an aspect of the present disclosure, the touch panel 120 of the display member 100 may be omitted. In this case, the display apparatus may be configured to sense a touch or pressure (or force) of a user by the one or more piezoelectric members 500. For example, when the touch panel 120 is omitted, the one or more piezoelectric members 500 may be configured to sense a touch or pressure (or force) of a user instead of a function of the touch panel 120.

The one or more piezoelectric members 500 may be configured to sense a user touch applied to the display member 100. A piezoelectric member may be an element having properties (i.e., a piezoelectric effect) where when an external force is applied, electrical polarization occurs to cause a potential difference, but when a voltage is applied, deformation or stress occurs. For example, the one or more piezoelectric members 500 may include a force sensor for sensing a pressure (or force) of the user touch. The one or more piezoelectric members 500 may output a force sensing signal, based on the pressure (or force) of the user touch and adjusts a sensitivity of the touch force data, based on touch mode information set by the user. For example, the force sensing signal may be a voltage signal. For example, the one or more piezoelectric members 500 may include a piezoelectric material (or a piezoelectric device) having a piezoelectric characteristic (or a piezoelectric effect). The one or more piezoelectric members 500 may include a ceramic-based piezoelectric material capable of implementing a relatively high piezoelectric characteristic, or may include piezoelectric ceramic having a perovskite-based crystalline structure. The piezoelectric member may be realized, for example, as crystal, tourmaline, Rochelle salt (potassium sodium tartrate tetrahydrate), barium titanate ($BaTiO_3$), ammonium dihydrogen phosphate (or monoammonium phosphate) ($NH_4H_2PO_4$), piezoceramics, etc. For example, the piezoelectric material may have a characteristic in which when pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto.

The one or more piezoelectric members 500 may be configured to be connected with the display member 100. For example, the one or more piezoelectric members 500 may be configured to be connected with a rear surface **100*a* of the display panel 110**.

As illustrated in FIG. 2, the one or more piezoelectric members 500 may include a plurality of piezoelectric members 510 and 520. For example, the plurality of piezoelectric members 510 and 520 may include a first piezoelectric member 510 and a second piezoelectric member 520, but aspects of the present disclosure are not limited thereto, the number of piezoelectric member is not limited to two, and can be any integer larger than two. The rear surface **100*a* of the display member 100 or the display panel 110 may include a plurality of regions or may be divided into a plurality of regions, and the first piezoelectric member 510 and the second piezoelectric member 520 may be disposed in each of the plurality of regions. For example, the display member 100 or the display panel 110 may be divided into a left region (or a first region) and a right region (or a second region) with respect to a first direction Y (or a horizontal direction), but aspects of the present disclosure are not limited thereto. The first piezoelectric member 510 may be disposed in the left region, and the second piezoelectric member 520 may be disposed in the right region, but aspects of the present disclosure are not limited thereto. For example, the plurality of piezoelectric members may include three piezoelectric members, and the display member 100 or the display panel 110 may be divided into a left region (or a first region), a middle region (or a second region) and a right region (or a third region) with respect to a first direction Y (or a horizontal direction), in which of which, one of the three piezoelectric members is disposed. Touch sensing driving of the one or more piezoelectric members 500 may be controlled by the touch driving circuit 600. For example, the touch driving circuit 600 may individually control each of the one or more piezoelectric members 500**.

The display member 100 according to an aspect of the present disclosure may further include a front member 130 which is at a front surface of the display panel 110.

The front member 130 may configure a foremost structure material with respect to the display apparatus and may protect a screen of the display panel 110. The front member 130 may be disposed at the front surface of the display panel 110. For example, the front member 130 may cover the front surface (or the screen) of the display panel 110, and thus, may protect the display panel 110 and the touch panel 120 from an external impact. For example, the front member 130 may be disposed at the front surface of the touch panel 120. For example, the touch panel 120 may be disposed between the front member 130 and the display panel 110. For example, the touch panel 120 may be connected with, coupled with, adhere to, or attached on a rear surface of the front member 130.

The front member 130 according to an aspect of the present disclosure may include a transparent plastic material, a glass material, or a tempered glass material, but aspects of the present disclosure are not limited thereto. As one an example aspect of the present disclosure, the front member 130 may include one of sapphire glass and gorilla glass or a stacked structure thereof. As another example aspect of the present disclosure, the front member 130 may include a transparent plastic material such as polyethylene terephthalate (PET) or the like. For example, the front member 130 may be a front structure, a front window, a cover window, a glass window, a cover screen, a screen cover, or window glass, but aspects of the present disclosure are not limited to the terms.

The display apparatus according to an aspect of the present disclosure may further include a supporting member 300 to support the display device. The supporting member 300 may be configured or disposed at the rear surface 100*a* of the display member 100 or the display panel 110. The supporting member 300 may be configured to cover or surround the rear surface 100*a* and/or lateral surfaces of the display member 100 or the display panel 110.

The supporting member 300 may include an internal space 300*s* which covers the rear surface 100*a* of the display member 100 or the display panel 110. For example, the supporting member 300 may include a box shape where one side (or an upper side) of the internal space 300*s* is opened.

The supporting member 300 according to an aspect of the present disclosure may include a first supporting portion 310 (e.g., a middle cabinet) and a second supporting portion 330.

The first supporting portion 310 may be configured or disposed at the rear surface 100*a* of the display member 100. For example, the first supporting portion 310 may be configured to cover the rear surface 100*a* of the display member 100. For example, the first supporting portion 310 may be configured to entirely cover the rear surface 100*a* of the display panel 110. The first supporting portion 310 may be spaced apart from the rear surface 100*a* of the display member 100 or the display panel 110. For example, the first supporting portion 310 may be spaced apart from the rear surface 100*a* of the display member 100 or the display panel 110 with the internal space 300*s* therebetween. For example, the first supporting portion 310 may be a bottom portion, a bottom plate, a supporting plate, a housing plate, a housing floor portion, or a housing bottom portion, the aspects of the present disclosure are not limited thereto.

The second supporting portion 330 may be configured or disposed at an edge of the display member 100. For example, the second supporting portion 330 may be configured or disposed at an edge of the front member 130 or at the edge of the rear surface 100*a* of the display member 100. For example, the second supporting portion 330 may be connected with an edge portion of the first supporting portion 310. For example, the second supporting portion 330 may include a structure where the edge portion of the first supporting portion 310 is bent. For example, the second supporting portion 330 may be a lateral portion, a sidewall, a supporting sidewall, a housing lateral surface, or a housing sidewall, the aspects of the present disclosure are not limited thereto.

The second supporting portion 330 may be provided as one body with the first supporting portion 310. For example, the first supporting portion 310 and the second supporting portion 330 may be provided as one body, and thus, the internal space 300*s* surrounded by the second supporting portion 330 may be provided on the first supporting portion 310. Accordingly, the supporting member 300 may include a box shape where one side (for example, an upper side or an upper portion) is opened by the first supporting portion 310 and the second supporting portion 330.

The display apparatus according to an aspect of the present disclosure may further include a coupling member 200 between the display member 100 and the supporting member 300.

The supporting member 300 may be coupled to, connected with, adhered to, or attached to the display member 100 by the coupling member 200. The supporting member 300 may be connected with, coupled to, adhered to, or attached to a rear edge portion of the display member 100 by the coupling member 200. For example, the supporting member 300 may be connected with, coupled to, adhered to, or attached to a rear edge portion of the front member 130 by the coupling member 200 and may surround a lateral surface of each of the touch panel 120 and the display panel 110.

According to an aspect of the present disclosure, the front member 130 of the display member 100 may be omitted. In this case, the coupling member 200 may be provided between the display panel 110 and the supporting member 300. For example, when the front member 130 is omitted, the coupling member 200 may be disposed between the rear edge portion of the display panel 110 or the touch panel 120 and a front edge portion of the first supporting portion 310.

The touch driving circuit 600 according to an aspect of the present disclosure may include a touch sensing part 610, a force sensing part 620, and a controller 650.

The touch sensing part 610 may be electrically connected with the touch panel 120, and thus, may drive all or some of a plurality of touch electrodes provided in the touch panel 120, sense all or some of the plurality of touch electrodes to receive a touch sensing signal, sample the received touch sensing signal to generate touch sensing data, and output the touch sensing signal or the touch sensing data. For example, the touch sensing signal may be analog information such as a voltage signal, and the touch sensing data may be digital information converted as a digital type, but aspects of the present disclosure are not limited thereto.

The touch sensing part 610 may transfer the touch sensing signal or the touch sensing data to the controller 650 or the force sensing part 620. For example, the touch sensing part 610 may be controlled by the controller 650 and may sense a touch. For example, the touch sensing part 610 may transfer the touch sensing signal or the touch sensing data to the controller 650, and the controller 650 may transfer the touch sensing signal or the touch sensing data to the force sensing part 620. Alternatively, the touch sensing part 610 may transfer the touch sensing signal or the touch sensing data to the force sensing part 620. Alternatively, the touch sensing part 610 may transfer the touch sensing signal or the touch sensing data to the force sensing part 620 and the controller 650.

The force sensing part 620 may be electrically connected with the one or more piezoelectric members 500 through a sensing channel, and thus, may receive a force sensing signal from the one or more piezoelectric members 500, sample the received force sensing signal to generate force sensing data, and transfer the generated force sensing data to the controller 650. For example, the force sensing part 620 may be configured to sense the force sensing signal based on a strain of each of the one or more piezoelectric members 500. The controller 650 may determine a touch input or a pressure (or force) of a user, based on the force sensing data. For example, the force sensing signal may be analog information such as a voltage signal, and the force sensing data may be digital information converted as a digital type, but aspects of the present disclosure are not limited thereto.

Force sensing driving of the force sensing part 620 may be controlled based on the touch sensing signal or the touch sensing data of the touch sensing part 610. For example, the force sensing part 620 may receive the touch sensing signal or the touch sensing data from the touch sensing part 610, and force sensing driving may be controlled based on the touch sensing signal or the touch sensing data received from the touch sensing part 610. Alternatively, the force sensing part 620 may receive the touch sensing signal or the touch sensing data from the controller 650. For example, the force sensing part 620 may receive the touch sensing signal or the touch sensing data of the touch sensing part 610 through the controller 650, and force sensing driving may be controlled based on the touch sensing signal or the touch sensing data transferred by the controller 650. Alternatively, the force sensing part 620 may receive a data packet including the touch sensing signal or the touch sensing data from the touch sensing part 610 through a communication interface. For example, the force sensing part 620 may communicate with the controller 650 through the communication interface and may receive the data packet including the touch sensing signal or the touch sensing data from the controller 650, and force sensing driving may be controlled based on the touch sensing signal or the touch sensing data included in the data packet. Also, the force sensing part 620 may transfer a data packet, including the force sensing data generated by the force sensing driving, to the controller 650.

Force sensing of the force sensing part 620 may be controlled based on the touch sensing signal or the touch sensing data of the touch sensing part 610. For example, force sensing of the force sensing part 620 may be driven in a first force sensing mode or a second force sensing mode, based on the touch sensing signal or the touch sensing data of the touch sensing part 610. A driving condition (for example, a driving frequency, etc.) of the first force sensing mode may differ from that of the second force sensing mode. For example, force sensing based on the first force sensing mode may be performed under a condition where the driving frequency is lower than the second force sensing mode. For example, the driving frequency may be a sampling frequency of an analog-to-digital converter (ADC) included in the force sensing part 620.

In the first force sensing mode, force sensing may be performed under a driving condition for reducing a standby power or a consumption power of the display apparatus. For example, force sensing based on the first force sensing mode may be performed with a driving frequency of 30 Hz, but aspects of the present disclosure are not limited thereto, and the driving frequency of the first force sensing mode may be a value other than 30 Hz. The force sensing part 620 may not transfer a force sensing signal or force sensing data to the controller 650 during the first force sensing mode. For example, the force sensing part 620 may not transfer the force sensing signal or the force sensing data to the controller 650 in the first force sensing mode. For example, the force sensing part 620 may deactivate a function of the communication interface during the first force sensing mode. For example, the force sensing part 620 may deactivate a function of the communication interface in the first force sensing mode. For example, the first force sensing mode may be referred to as an idle sensing mode, a low power sensing mode, a low speed sensing mode, or a deactivation sensing mode (or deactivation mode), but aspects of the present disclosure are not limited to the terms.

According to an aspect of the present disclosure, the force sensing part 620 may reduce a sampling frequency of the ADC of the force sensing part 620 during the first force sensing mode to decrease the standby power or the consumption power and may deactivate a function of the communication interface to reduce a process load of the force sensing part 620 and/or the controller 650. For example, the force sensing part 620 may reduce the sampling frequency of the ADC of the force sensing part 620 in the first force sensing mode to decrease the standby power or the consumption power and may deactivate a function of the communication interface to reduce the process load of the force sensing part 620 and/or the controller 650.

Force sensing based on the second force sensing mode may be performed under a driving condition for increasing the accuracy of sensing of a touch or a pressure (or force) of the user. In the second force sensing mode, the force sensing data generated by sampling the force sensing signal may be transferred to the controller 650. For example, the force sensing based on the second force sensing mode may be performed with a driving frequency of 120 Hz or more, but aspects of the present disclosure are not limited thereto, and the force sensing based on the second force sensing mode may be performed with a driving frequency of another frequency or more. In the second force sensing mode, the force sensing part 620 may transfer the force sensing signal or the force sensing data to the controller 650. For example, during the second force sensing mode, the force sensing part 620 may transfer the force sensing signal or the force sensing data to the controller 650. For example, the force sensing part 620 may activate a function of the communication interface during the second force sensing mode. For example, the force sensing part 620 may activate a function of the communication interface in the second force sensing mode. For example, the second force sensing mode may be referred to as a run sensing mode, a normal sensing mode, a high speed sensing mode, or an activation sensing mode (or activation mode), but aspects of the present disclosure are not limited to the terms.

The controller 650 may control the touch sensing part 610 to an activation mode or a deactivation mode, based on the touch sensing signal or the touch sensing data of the touch sensing part 610. For example, in the activation mode, when the touch sensing signal or the touch sensing data is greater than a touch threshold value (e.g., a criterion for determining a touch internally), the touch sensing part 610 may determine that a real touch is applied and may perform an operation of determining a touch position (or region), based on the touch sensing signal or the touch sensing data. For example, when a significant touch of the user is sensed, the touch sensing part 610 may operate in the activation mode, based on the touch sensing signal or the touch sensing data. Also, in the deactivation mode, when the touch sensing signal or the touch sensing data does not satisfy the touch threshold value, the touch sensing part 610 may determine that a real touch is not applied and may not perform processing on the touch sensing signal or the touch sensing data. For example, when a significant touch of the user is not sensed, the touch sensing part 610 may operate in the deactivation mode, based on the touch sensing signal or the touch sensing data.

In the second force sensing mode, the force sensing part 620 may transfer the force sensing signal or the force sensing data to the controller 650 while the touch sensing part 610 is in the activation mode. For example, in the second force sensing mode, the force sensing part 620 may transfer the force sensing signal or the force sensing data to the controller 650, based on the touch sensing signal of the touch sensing part 610. For example, in the second force sensing mode, the force sensing part 620 may transfer the force sensing signal or the force sensing data to the controller 650 only while the touch sensing part 610 is in the activation mode and may not transfer the force sensing signal or the force sensing data to the controller 650 while the touch sensing part 610 is in the deactivation mode. For example, in the second force sensing mode, the force sensing part 620 may transfer the force sensing signal or the force sensing data to the controller 650, based on the touch sensing signal of the touch sensing part 610, and may not transfer the force sensing signal or the force sensing data to the controller 650 while the touch sensing part 610 is in the deactivation mode. In the second force sensing mode, when a significant touch or pressure (or force) of the user is not sensed, data communication may not be performed, and thus, an undesired process load may be reduced.

In the second force sensing mode, the touch sensing part 610 may be changed to the deactivation mode, and then, the force sensing part 620 may be changed to the first force sensing mode. For example, the force sensing part 620 may be changed to the first force sensing mode after a certain time elapses. For example, when the touch sensing part 610 is changed to the deactivation mode in the second force sensing mode, the force sensing part 620 may be changed to the first force sensing mode after a certain time elapses. For example, the certain time may be counted as the number of samplings of the ADC of the force sensing part 620. Alternatively, the certain time may be a predetermined time and may be a time of 1 sec to 3 sec, but aspects of the present disclosure are not limited thereto. The certain time may be counted from a change time of the deactivation mode of the touch sensing part 610. For example, when the touch sensing part 610 is changed from the deactivation mode to the activation mode within the certain time, the force sensing part 620 may maintain the second force sensing mode. For example, when the touch sensing part 610 is changed from the deactivation mode to the activation mode and then the touch sensing part 610 maintains the activation mode (for example, for a period of time), the force sensing part 620 may maintain the second force sensing mode. Alternatively, when the deactivation mode of the touch sensing part 610 is maintained until the certain time elapses, the force sensing part 620 may be changed from the second force sensing mode to the first force sensing mode. The force sensing part 620 may not be changed to the first force sensing mode in synchronization with that the touch sensing part 610 is changed to the deactivation mode and may maintain the second force sensing mode for the certain time, and thus, instead of that a touch is temporarily performed only once, immediate force sensing driving may be possible in a fast repetition touch operation, thereby improving a latency characteristic and the stability of force sensing.

The controller 650 may be configured to control the touch sensing part 610 and the force sensing part 620. The controller 650 may generate a control signal which controls driving of the touch sensing part 610 and the force sensing part 620 and may transfer the generated control signal to each of the touch sensing part 610 and the force sensing part 620. Also, the controller 650 may execute a touch algorithm by the touch sensing signal or the touch sensing data received from the touch sensing part 610 and the force sensing signal or the force sensing data received from the force sensing part 610 and may determine whether there is a touch input or not, a touch position (or region), and a pressure (or force) of the touch input.

Figure 3:
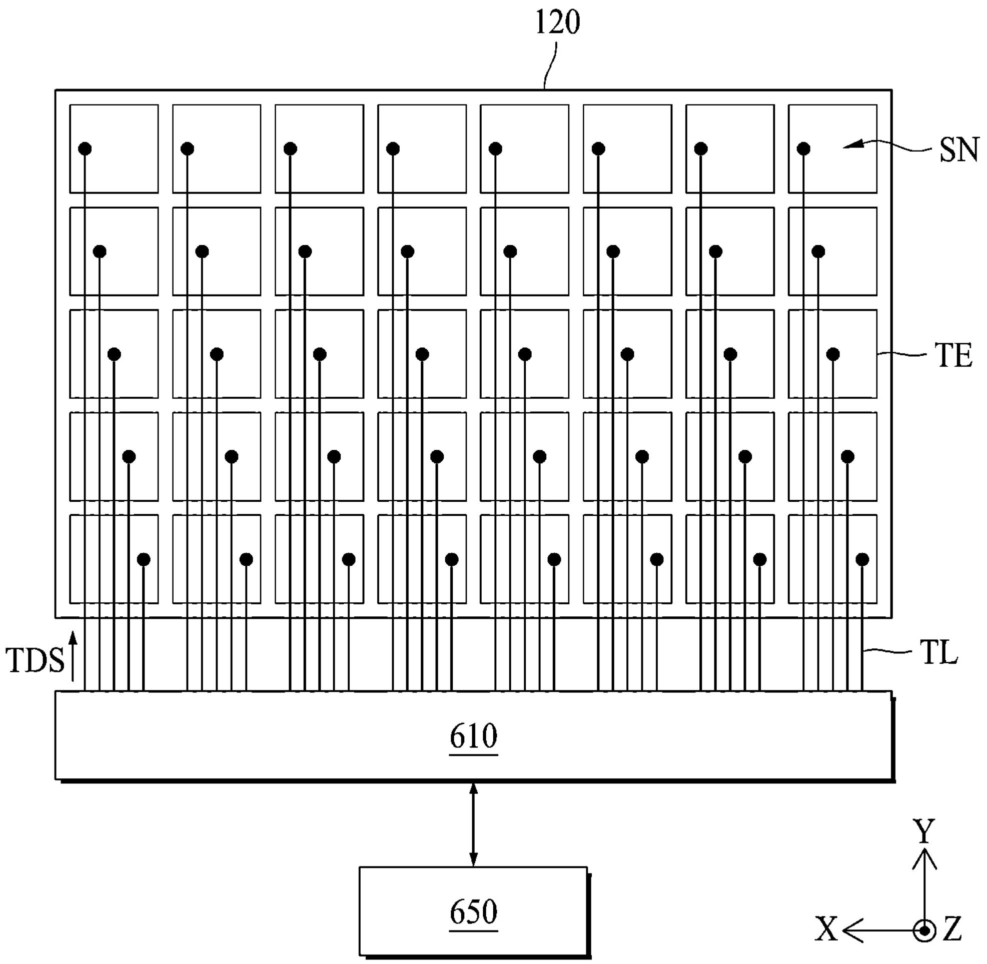
FIGS. 3 and 4 illustrate a touch panel according to an aspect of the present disclosure.
Figure 4:
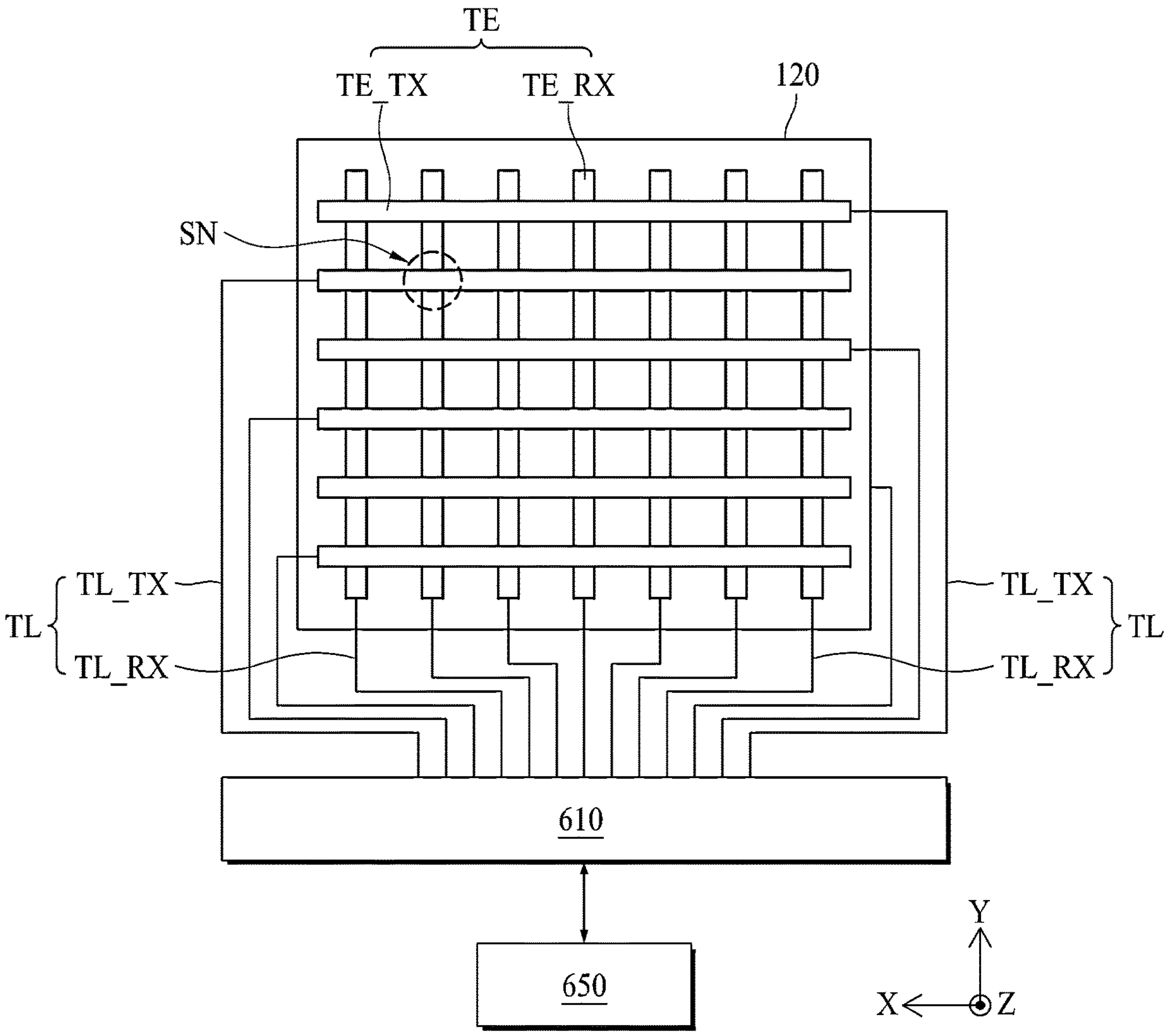

FIGS. 3 and 4 illustrate a touch panel according to an aspect of the present disclosure.

Referring to FIGS. 3 and 4, a display apparatus according to an aspect of the present disclosure may include a touch panel 120, a touch sensing part 610, and a controller 650, so as to sense one or more of a finger touch based on a finger 10 and a touch based on a touch pen (for example, a stylus pen). For example, the touch sensing part 610 may drive and sense the touch panel 120 to generate and output a touch sensing signal or touch sensing data. The controller 650 may control driving of the touch sensing part 610 and may determine whether there is a touch input or not and a touch position (or region) by the touch sensing signal or the touch sensing data received from the touch sensing part 610.

The touch panel 120 may include a touch sensor including a plurality of touch electrodes TE. Also, the touch panel 120 may further include a plurality of touch lines TL for electrically connecting the touch sensing part 610 with the plurality of touch electrodes TE.

The touch sensing part 610 may supply a touch driving signal TDS to all or some of the plurality of touch electrodes TE and may sense all or some of the plurality of touch electrodes TE to generate the touch sensing signal or the touch sensing data, and then, may provide the touch sensing signal or the touch sensing data to the controller 650. For example, the touch sensing signal may be an electrical signal in the touch electrode TE, and the touch sensing data may be signal data obtained by sampling an analog touch sensing signal as a digital type.

The controller 650 may communicate with the touch sensing part 610, control an operation of the touch sensing part 610, execute the touch algorithm by the touch sensing signal or the touch sensing data received from the touch sensing part 610, and determine whether there is a touch input or not and a touch position (or region).

The controller 650 may provide the touch sensing part 610 with a touch synchronization signal for controlling an operation of the touch sensing part 610. The controller 650 may provide the touch sensing part 610 with the touch driving signal TDS or a signal corresponding thereto, which may be generated based on the touch synchronization signal. The touch driving signal TDS may be a signal where a voltage level varies over time. For example, the touch driving signal TDS may have various types such as a square wave, a triangle wave, or a sine wave, but aspects of the present disclosure are not limited thereto. When the touch driving signal TDS is a square wave, the touch driving signal TDS may be a pulse width modulation (PWM) signal.

The touch panel 120 according to an aspect of the present disclosure may provide a touch sensing function of a self-capacitance type which measures a capacitance generated in each touch electrode TE or a variation of the capacitance to sense a touch, or may provide a touch sensing function of a mutual-capacitance type which measures a capacitance between the touch electrodes TE or a variation of the capacitance to sense a touch, but aspects of the present disclosure are not limited thereto.

A touch sensor structure illustrated in FIG. 3 is based on the self-capacitance type, and a touch sensor structure illustrated in FIG. 4 is based on the mutual-capacitance type. The touch sensor structures illustrated in FIGS. 3 and 4 are illustrated as an equivalent circuit type, and a shape of a touch electrode, a size of the touch electrode, the arrangement of the touch electrode, a line structure, line arrangement, and the like may be variously modified, but aspects of the present disclosure are not limited thereto.

Referring to FIG. 3, the touch panel 120 may provide a touch sensing function based on the self-capacitance type. The touch panel 120 may include a plurality of touch electrodes TE separated from one another and a plurality of touch lines TL which electrically connect the plurality of touch electrodes TE with the touch sensing part 610. For example, a size of a region where one touch electrode TE is provided may correspond to a size of a region where one subpixel is provided, or may be greater than that of a region where one subpixel is provided, but aspects of the present disclosure are not limited thereto. For example, when a size of a region where one touch electrode TE is provided is greater than or equal to that of a region where two or more subpixels are provided, the one touch electrode TE may overlap two or more data lines and two or more gate lines.

The touch sensing part 610 may supply the touch driving signal TDS to each of the plurality of touch electrodes TE, sense a touch electrode TE to which the touch driving signal TDS is supplied, and generate and output a touch sensing signal or touch sensing data including a sensing value based on a sensed result. For example, the sensing value may correspond to a capacitance between the touch electrode TE and a touch object such as a finger. Each touch electrode TE may correspond to a sensing node SN. For example, the sensing node SN may be at a position (or region) corresponding to touch coordinates and may correspond to the sensing value.

Referring to FIG. 4, the touch panel 120 may provide a touch sensing function based on the mutual-capacitance type. The plurality of touch electrodes TE disposed in the touch panel 120 may include touch driving electrodes TE_TX and touch sensing electrodes TE_RX. The plurality of touch lines TL disposed in the touch panel 120 may include touch driving lines TL_TX electrically connected with the touch driving electrodes TE_TX and touch sensing lines TL_RX electrically connected with the touch sensing electrodes TE_RX.

As illustrated in FIG. 4, the touch driving electrodes TE_TX may extend in a first direction X and may be arranged apart from one another by a certain interval in parallel in a second direction Y intersecting with the first direction X. The touch sensing electrodes TE_RX may extend in the second direction Y and may be arranged apart from one another by a certain interval in parallel in the first direction X. Alternatively, the touch driving electrodes TE_TX may extend in a second direction Y and may be arranged apart from one another by a certain interval in parallel in a first direction X intersecting with the second direction Y. The touch sensing electrodes TE_RX may extend in the first direction X and may be arranged apart from one another by a certain interval in parallel in the second direction Y. For example, each of one touch driving electrode TE_TX and one touch sensing electrode TE_RX may be formed in a bar shape, but aspects of the present disclosure are not limited thereto, and may be formed in any other shape as needed, for example, a circle shape, a diamond shape, etc.

The touch sensing part 610 may supply the touch driving signal TDS to the touch driving electrodes TE_TX, sense the touch sensing electrodes TE_RX, and generate and output a touch sensing signal or touch sensing data including a sensing value based on a sensed result. For example, the sensing value may correspond to a capacitance between the touch driving electrodes TE_TX and the touch sensing electrodes TE_RX. An intersection point between the touch driving electrodes TE_TX and the touch sensing electrodes TE_RX may correspond to the sensing node SN. For example, the sensing node SN may be at a position (or region) corresponding to touch coordinates and may correspond to the sensing value.

Figure 5:
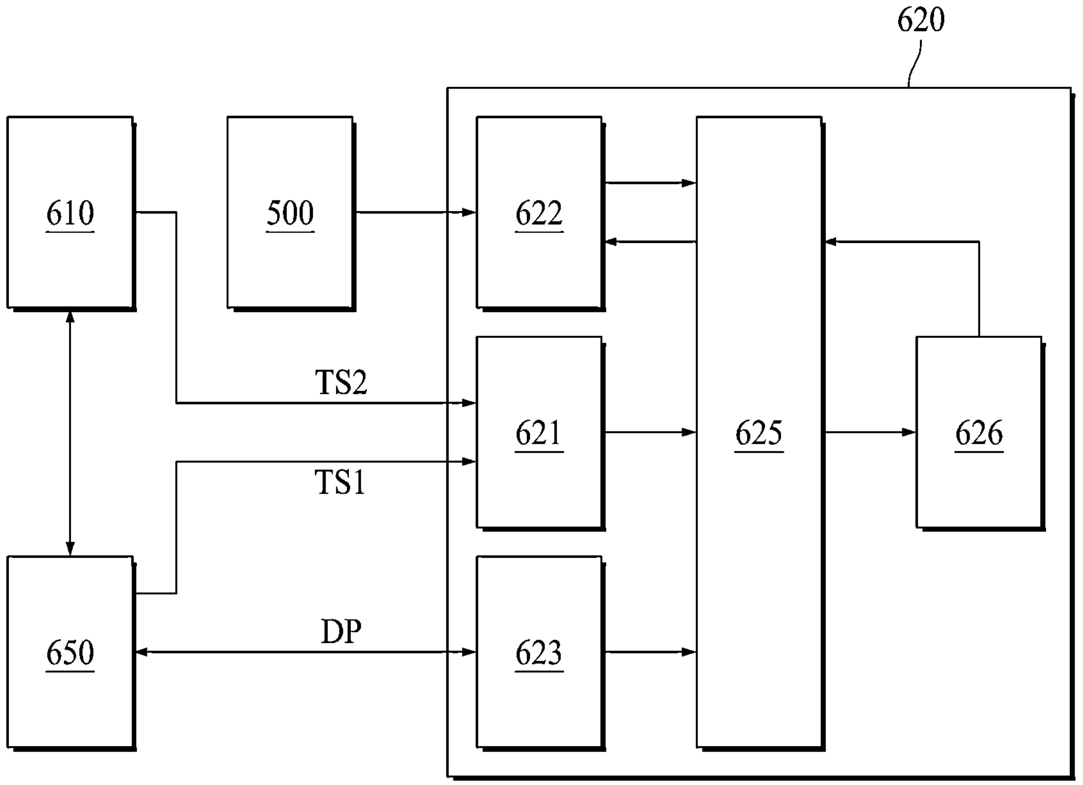
FIG. 5 illustrates a touch driving circuit according to an aspect of the present disclosure.
Figure 6:
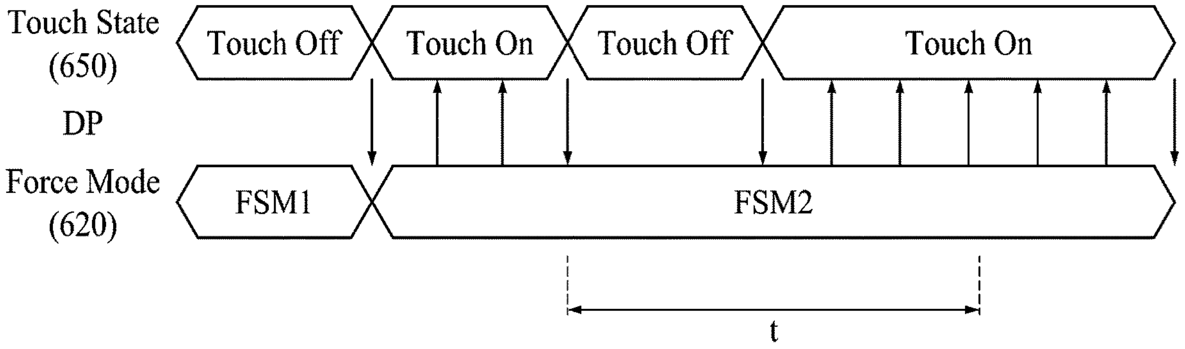
FIGS. 6 and 7 illustrate diagrams for describing a driving operation of a touch driving circuit according to an aspect of the present disclosure.
Figure 7:
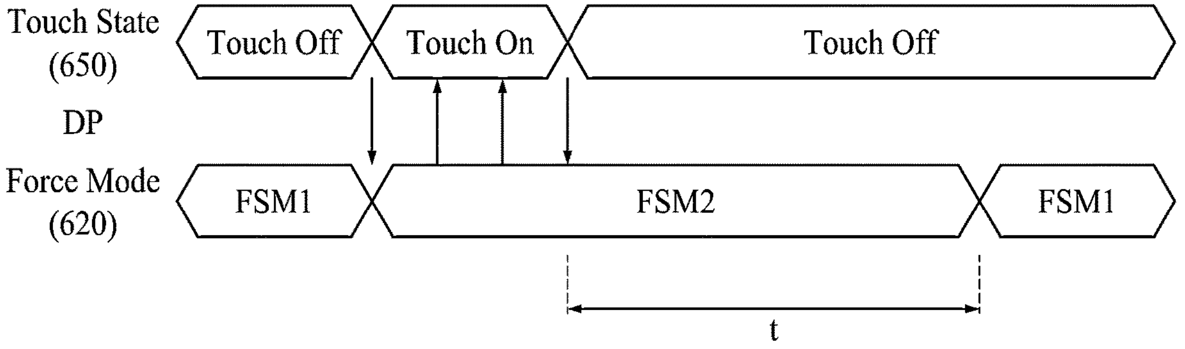

FIG. 5 illustrates a touch driving circuit 600 according to an aspect of the present disclosure. FIGS. 6 and 7 illustrate for describing a driving operation of the touch driving circuit 600 according to an aspect of the present disclosure.

Referring to FIGS. 5 to 7, the touch driving circuit 600 according to an aspect of the present disclosure may include a touch sensing part 610, a force sensing part 620, and a controller 650.

The touch sensing part 610 may transfer a touch sensing signal or touch sensing data, sensed through a touch panel 120, to the controller 650 or the force sensing part 620. For example, the touch sensing part 610 may transfer the touch sensing signal or the touch sensing data to the controller 650, and the controller 650 may transfer a touch sensing signal TS1 or the touch sensing data to the force sensing part 620. Alternatively, the touch sensing part 610 may transfer a touch sensing signal TS2 or the touch sensing data to the force sensing part 620.

The controller 650 may be configured to control the touch sensing part 610 and the force sensing part 620. The controller 650 may generate a control signal which controls driving of the touch sensing part 610 and the force sensing part 620 and may transfer the generated control signal to each of the touch sensing part 610 and the force sensing part 620. The controller 650 may control the touch sensing part 610 to the activation mode or the deactivation mode, based on the touch sensing signal or the touch sensing data. The controller 650 may receive the touch sensing signal or the touch sensing data of the touch sensing part 610 and may transfer the received touch sensing signal TS1 or touch sensing data to the force sensing part 620. Alternatively, the controller 650 may include a communication interface. The controller 650 may communicate with the touch sensing part 610 and the force sensing part 620 through the communication interface. The controller 650 may convert the touch sensing signal or the touch sensing data into a data packet DP and may transfer the data packet DP, including the touch sensing signal or the touch sensing data, to the force sensing part 620 through the communication interface. Also, the controller 650 may receive a data packet DP, including a force sensing signal or a force sensing data, from the force sensing part 620 through the communication interface.

The force sensing part 620 may be electrically connected with one or more piezoelectric members 500 through a sensing channel, and thus, may receive the force sensing signal from the one or more piezoelectric members 500, sample the received force sensing signal to generate force sensing data, and transfer the generated force sensing data to the controller 650.

The force sensing part 620 according to an aspect of the present disclosure may include a signal input unit 621, an ADC 622, a communication interface 623, a force sensing controller 625, and a timer 626.

The signal input unit 621 may be electrically connected with the touch sensing part 610 and/or the controller 650. The signal input unit 621 may receive a signal or data from the touch sensing part 610 and/or the controller 650 in a single direction. For example, the signal input unit 621 may be a general-purpose input or a special (e.g., interrupt) input terminal which receives a signal from the touch sensing part 610 and/or the controller 650, but aspects of the present disclosure are not limited thereto. For example, the signal input unit 621 may receive the touch sensing signal TS1 or the touch sensing data of the touch sensing part 610 through the controller 650. Alternatively, the signal input unit 621 may receive a touch sensing signal TS2 or touch sensing data from the touch sensing part 610. The signal input unit 621 may transfer the received touch sensing signal or touch sensing data to the force sensing controller 625.

The ADC 622 may be electrically connected with the one or more piezoelectric members 500 and may sample and sense the force sensing signal received from the one or more piezoelectric members 500. The ADC 622 may transfer the force sensing signal, received from the one or more piezoelectric members 500, to the force sensing controller 625. For example, the ADC 622 may sample an analog force sensing signal received from the one or more piezoelectric members 500 to generate digital force sensing data and may transfer the force sensing data to the force sensing controller 625. In the ADC 622, a sampling frequency (or period) for sampling a received signal may vary. For example, the sampling frequency (or period) of the ADC 622 may vary based on control by the force sensing controller 625.

The communication interface 623 may be configured to communicate with the controller 650. The communication interface 623 may receive the data packet DP including the touch sensing signal or the touch sensing data from the controller 650, or may transfer the data packet DP including the force sensing signal or the force sensing data to the controller 650. The communication interface 623 may include a serial peripheral interface (SPI), an I2C interface, an EPI interface, a low voltage differential signaling (LVDS) interface, a reduced swing differential signaling (RSDS) interface, a Time Minimized Differential Signaling (TMDS) interface, or the like, but aspects of the present disclosure are not limited thereto.

The force sensing controller 625 may be configured to control a force sensing driving of the force sensing part 620. The force sensing controller 625 may control the force sensing driving, based on the touch sensing signal or the touch sensing data of the touch sensing part 610. For example, the force sensing controller 625 may control the force sensing driving, based on the touch sensing signals TS1 and TS2 or the touch sensing data transferred from the signal input unit 621. Alternatively, the force sensing controller 625 may control the force sensing driving, based on the data packet DP including the touch sensing signal or the touch sensing data transferred through the communication interface 623.

The force sensing controller 625 may control force sensing driving in a first force sensing mode FSM1 or a second force sensing mode FSM2, based on the touch sensing signal or the touch sensing data of the touch sensing part 610. A driving condition (for example, a driving frequency, etc.) of the first force sensing mode FSM1 may differ from that of the second force sensing mode FSM2. For example, force sensing based on the first force sensing mode FSM1 may be performed under a condition where the driving frequency is lower than the second force sensing mode FSM2. For example, the driving frequency may be a sampling frequency of the ADC 622 included in the force sensing part 620.

In the first force sensing mode FSM1, the force sensing controller 625 may control the ADC 622 to change the sampling frequency of the ADC 622 to a driving frequency of a low frequency (or low speed). For example, in the first force sensing mode FSM1, the force sensing controller 625 may control the sampling frequency of the ADC 622 to a driving frequency of 30 Hz, but aspects of the present disclosure are not limited thereto.

The force sensing controller 625 may control not to transfer the force sensing signal or the force sensing data to the controller 650 during the first force sensing mode FSM1. For example, the force sensing controller 625 may deactivate a function of a communication interface 623 during the first force sensing mode FSM1. The force sensing controller 625 may not transfer the data packet DP to the controller 650. In the first force sensing mode FSM1, force sensing may be performed under a driving condition for reducing a standby power or a consumption power of the display apparatus. For example, the first force sensing mode FSM1 may be referred to as an idle sensing mode, a low power sensing mode, a low speed sensing mode, or a deactivation sensing mode (or deactivation mode), but aspects of the present disclosure are not limited to the terms.

In the second force sensing mode FSM2, the force sensing controller 625 may control the ADC 622 to change the sampling frequency of the ADC 622 to a driving frequency of a high frequency (or high speed). For example, in the second force sensing mode FSM2, the force sensing controller 625 may control the sampling frequency of the ADC 622 to a driving frequency of 120 Hz or more, but aspects of the present disclosure are not limited thereto.

In the second force sensing mode FSM2, the force sensing controller 625 may transfer the force sensing data, generated by sampling the force sensing signal, the controller 650. For example, the force sensing controller 625 may activate a function of the communication interface 623 during the second force sensing mode FSM2. For example, the force sensing controller 625 may activate a function of the communication interface 623 in the second force sensing mode FSM2. For example, force sensing based on the second force sensing mode may be performed under a driving condition for increasing the accuracy of sensing of a touch or a pressure (or force) of the user. For example, the second force sensing mode FSM2 may be referred to as a run sensing mode, a normal sensing mode, a high speed sensing mode, or an activation sensing mode (or activation mode), but aspects of the present disclosure are not limited to the terms.

The force sensing controller 625 may determine a state of the touch sensing part 610, based on the touch sensing signal or the touch sensing data of the touch sensing part 610. For example, the force sensing controller 625 may determine whether the touch sensing part 610 is in an activation mode (Touch On) or a deactivation mode (Touch Off), based on the touch sensing signal or the touch sensing data of the touch sensing part 610. Alternatively, the force sensing controller 625 may determine whether the touch sensing part 610 is in the activation mode (Touch On) or the deactivation mode (Touch Off), based on the control signal of the controller 650. For example, when the touch sensing signal or the touch sensing data is greater than a touch threshold value (e.g., a criterion for determining a touch therein), the activation mode (Touch On) of the touch sensing part 610 may be a driving mode which determines that a real touch is performed, and performs an operation of determining a touch position (or region), based on the touch sensing signal or the touch sensing data. Also, when the touch sensing signal or the touch sensing data does not satisfy the touch threshold value, the deactivation mode (Touch Off) of the touch sensing part 610 may be a driving mode which determines that a real touch is not applied, and does not perform processing on the touch sensing signal or the touch sensing data.

In the second force sensing mode FSM2, the force sensing controller 625 may transfer the force sensing signal or the force sensing data to the controller 650 while the touch sensing part 610 is in the activation mode (Touch On). For example, in the second force sensing mode FSM2, the force sensing controller 625 may transfer the force sensing signal or the force sensing data to the controller 650 only while the touch sensing part 610 is in the activation mode and may not transfer the force sensing signal or the force sensing data to the controller 650 while the touch sensing part 610 is in the deactivation mode (Touch Off). In the second force sensing mode FSM2, when a significant touch or pressure (or force) of the user is not sensed, data communication may not be performed, and thus, an undesired process load may be reduced.

The timer 626 may count the number of samplings of the ADC 622, based on control by the force sensing controller 625.

In the second force sensing mode, the touch sensing part 610 may be changed to the deactivation mode (Touch Off), and then, the force sensing controller 625 may change the second force sensing mode FSM2 to the first force sensing mode FSM1. For example, when the touch sensing part 610 is changed to the deactivation mode (Touch Off) in the second force sensing mode FSM2, the force sensing part 620 may be changed to the first force sensing mode after a certain time t elapses. The force sensing controller 625 may check whether the certain time t elapses, based on the timer 626. For example, the timer 626 may count the number of samplings of the ADC 622, and thus, whether the certain time t elapses may be transferred or transmitted to the force sensing controller 625. Alternatively, the timer 626 may count a time, and thus, whether the certain time t elapses may be transferred or transmitted to the force sensing controller 625. The force sensing controller 625 may drive the timer 626 at a change time of the deactivation mode (Touch Off) of the touch sensing part 610, and thus, may determine whether the certain time t elapses.

As illustrated in FIG. 6, when the touch sensing part 610 is changed from the deactivation mode (Touch Off) to the activation mode (Touch On) within the certain time t, the force sensing controller 625 may maintain the second force sensing mode FSM2. For example, when the touch sensing part 610 is changed from the deactivation mode (Touch Off) to the activation mode (Touch On), the force sensing controller 625 may maintain the second force sensing mode FSM2.

As illustrated in FIG. 7, when the deactivation mode (Touch Off) of the touch sensing part 610 is maintained until the certain time t elapses, the force sensing controller 625 may change the second force sensing mode FSM2 to the first force sensing mode FSM1. For example, in the deactivation mode (Touch Off) of the touch sensing part 610, the force sensing controller 625 may change the second force sensing mode FSM2 to the first force sensing mode FSM1.

According to an aspect of the present disclosure, the force sensing part 620 may reduce a sampling frequency of the ADC 622 of the force sensing part 620 during the first force sensing mode FSM1 to decrease the standby power or the consumption power and may deactivate a function of the communication interface 623 to reduce a process load of the force sensing part 620 and/or the controller 650. Also, in the second force sensing mode FSM2, when a significant touch or pressure (or force) of the user is not sensed, the force sensing part 620 may not perform data communication, and thus, an undesired process load may be reduced.

According to an aspect of the present disclosure, the force sensing part 620 may not be changed to the first force sensing mode FSM1 in synchronization with that the touch sensing part 610 is changed to the deactivation mode (Touch Off) and may maintain the second force sensing mode FSM2 for the certain time t, and thus, instead of that a touch is temporarily performed only once, immediate force sensing driving may be possible in a fast repetition touch operation, thereby improving a latency characteristic and the stability of force sensing.

Figure 8:
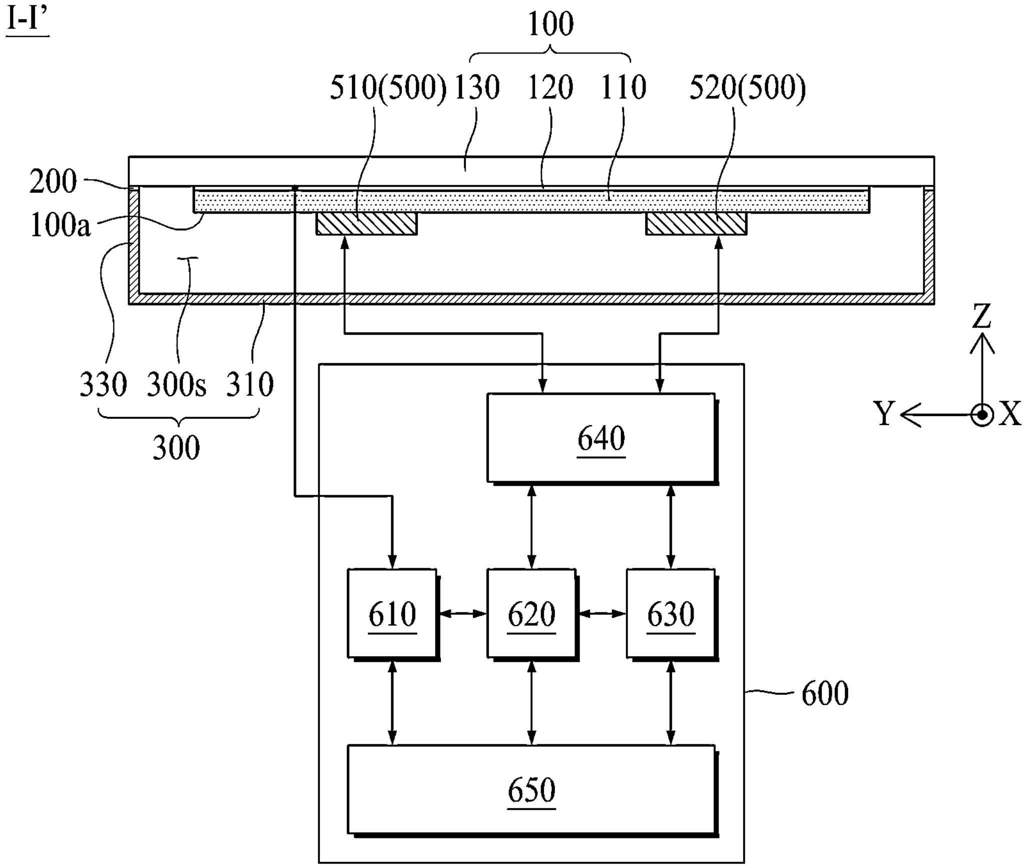
FIG. 8 illustrates a touch driving circuit and a cross-sectional surface taken along line I-I' illustrated in FIG. 1 according to another aspect of the present disclosure.
Figure 9:
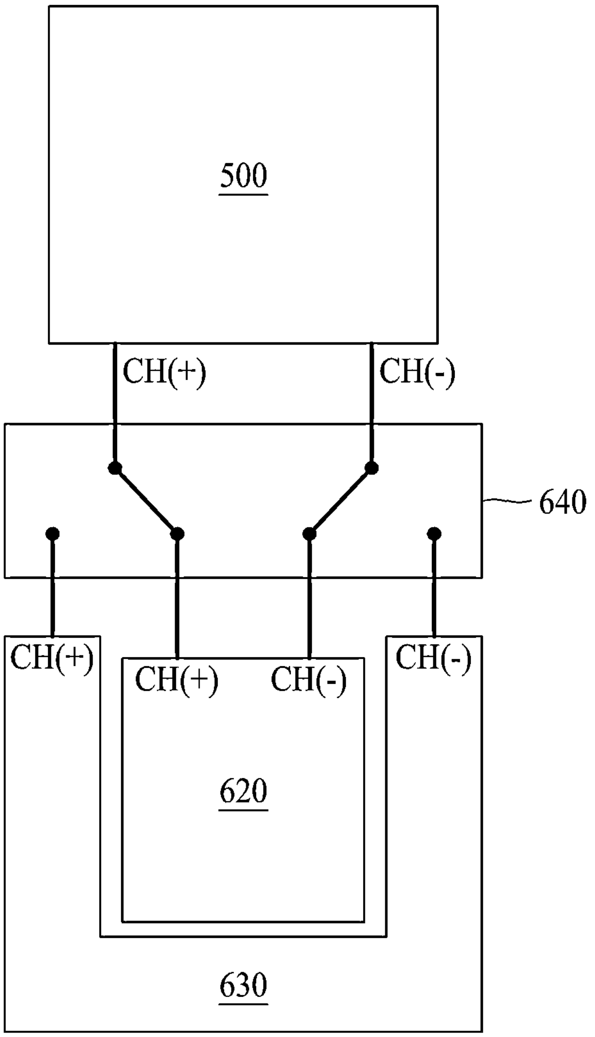
FIGS. 9 to 11 illustrate a driving operation of a touch driving circuit according to another aspect of the present disclosure.
Figure 10:
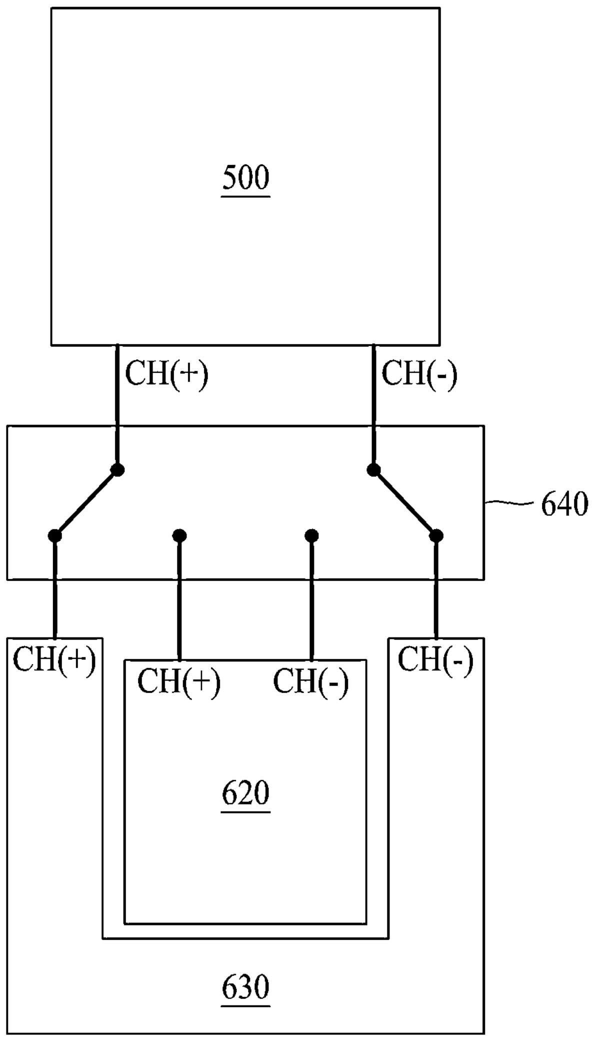
Figure 11:
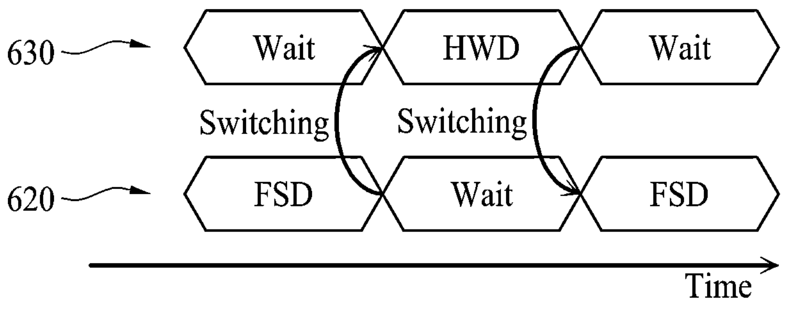

FIG. 8 illustrates a touch driving circuit and a cross-sectional surface taken along line I-I' illustrated in FIG. 1 according to another aspect of the present disclosure. FIGS. 9 to 11 illustrate a driving operation of a touch driving circuit according to another aspect of the present disclosure. FIG. 8 illustrates a configuration where a function of a piezoelectric member and a vibration driver are added in the touch driving circuit described above with reference to FIGS. 1 and 2. Therefore, in the following description, like elements other than a function of a piezoelectric member, a vibration driver, and relevant elements are referred to by like reference numerals, and thus, repeated descriptions thereof are omitted or will be briefly given.

Referring to FIGS. 8 to 11, the display apparatus according to another aspect of the present disclosure may be configured to sense one or more of a finger touch based on a finger 10 and a touch based on a touch pen (for example, a stylus pen). For example, the display apparatus according to another aspect of the present disclosure may be a display apparatus to which a touch panel (e.g., screen) supplied with a haptic feedback vibration is added or a display apparatus with a touch panel (e.g., screen) integrated therein. For example, the display apparatus according to another aspect of the present disclosure may be used as a mobile electronic device, such as a mobile phone, a smartphone, a smart glass, a wearable device, a smart watch, a personal digital assistants (PDA), a portable multimedia player (PMP), a navigator, a smart watch, a tablet PC, or a watch phone, or a display apparatus such as a smart TV, an electronic bulletin board, a (e.g., bidirectional) information transfer transparent display, a bidirectional digital signage, a notebook computer, a monitor, a set-top box (STB), a DMB receiver, a radio, a washing machine, a robot, a vehicle, or a refrigerator, but aspects of the present disclosure are not limited thereto.

The display apparatus according to another aspect of the present disclosure may include a display member 100 and a touch driving circuit 600.

The display member 100 may be configured to display an image and may provide a user interface which senses a touch or pressure (or force) of a user to recognize a user input and provides a haptic feedback vibration to the user.

The display member 100 may include a display panel 110, a touch panel 120, and one or more piezoelectric members 500. For example, the display member 100 may include a touch panel 120 which is connected with the display panel 110 and senses a touch.

The one or more piezoelectric members 500 according to another aspect of the present disclosure may be configured to sense a user touch applied to the display member 100 and provide a haptic feedback vibration, based on touch sensing. For example, the one or more piezoelectric members 500 may be configured to sense a pressure (or force) based on a user touch and vibrate the display member 100. Therefore, the one or more piezoelectric members 500 may implement a force and haptic. For example, the one or more piezoelectric members 500 may include a piezoelectric material (or a piezoelectric device) having a piezoelectric characteristic (or a piezoelectric effect). The one or more piezoelectric members 500 may vibrate the display member 100 by an inverse piezoelectric effect based on a vibration driving signal and may generate an electrical signal by the piezoelectric effect based on a strain (or bending) of the display member 100. The one or more piezoelectric members 500 may output a force sensing signal based on pressure (or force) produced by a user touch. For example, the force sensing signal may be a voltage signal. Also, the one or more piezoelectric members 500 may autonomously vibrate (or displace or drive) based on a vibration (or displacement or driving) of a piezoelectric material caused by a vibration driving signal applied to the piezoelectric material.

The one or more piezoelectric members 500 may include a ceramic-based piezoelectric material capable of implementing a relatively high piezoelectric characteristic, or may include piezoelectric ceramic having a perovskite-based crystalline structure. For example, the piezoelectric material may have a characteristic in which when pressure or twisting is applied to a crystalline structure by an external force, a potential difference occurs due to dielectric polarization caused by a relative position change of a positive (+) ion and a negative (−) ion, and a vibration is generated by an electric field based on a voltage applied thereto.

The one or more piezoelectric members 500 may be configured to be connected with the display member 100. For example, the one or more piezoelectric members 500 may be configured to be connected with a rear surface 100*a* of the display panel 110.

As illustrated in FIG. 8, the one or more piezoelectric members 500 may include a plurality of piezoelectric members 510 and 520. For example, the plurality of piezoelectric members 510 and 520 may include a first piezoelectric member 510 and a second piezoelectric member 520. The rear surface 100*a* of the display member 100 or the display panel 110 may include a plurality of regions or may be divided into a plurality of regions, and the first piezoelectric member 510 and the second piezoelectric member 520 may be disposed in each of the plurality of regions. For example, the display member 100 or the display panel 110 may be divided into a left region (or a first region) and a right region (or a second region) with respect to a first direction Y (or a horizontal direction), but aspects of the present disclosure are not limited thereto. The first piezoelectric member 510 may be disposed in the left region, and the second piezoelectric member 520 may be disposed in the right region. Touch sensing driving and/or vibration generation driving of the one or more piezoelectric members 500 may be controlled by the touch driving circuit 600.

The touch driving circuit 600 according to another aspect of the present disclosure may include a touch sensing part 610, a force sensing part 620, a vibration driver 630, a switching circuit part 640, and a controller 650.

The touch driving circuit 600 may be connected with the display member 100. For example, the touch driving circuit 600 may be configured to sense at least one of a touch and a pressure of the display member 100.

The touch sensing part 610 may be electrically connected with the touch panel 120, and thus, may drive all or some of a plurality of touch electrodes provided in the touch panel 120, sense all or some of the plurality of touch electrodes to receive a touch sensing signal, sample the received touch sensing signal to generate touch sensing data, and output the touch sensing signal or the touch sensing data. For example, the touch sensing signal may be analog information such as a voltage signal, and the touch sensing data may be digital information converted as a digital type, but aspects of the present disclosure are not limited thereto.

The force sensing part 620 may be electrically connected with the one or more piezoelectric members 500 through a sensing channel, and thus, may receive a force sensing signal from the one or more piezoelectric members 500, sample the received force sensing signal to generate force sensing data, and transfer the generated force sensing data to the controller 650. The controller 650 may determine a touch input or a pressure (or force) of a user, based on the force sensing data. For example, the force sensing signal may be analog information such as a voltage signal, and the force sensing data may be digital information converted as a digital type, but aspects of the present disclosure are not limited thereto.

The vibration driver 630 may be electrically connected with the one or more piezoelectric members 500 through the vibration channel and may apply the vibration driving signal to the one or more piezoelectric members 500 to vibrate the one or more piezoelectric members 500. Vibration generation driving of the vibration driver 630 may be controlled based on at least one of the touch sensing signal and the force sensing signal. For example, the vibration driver 630 may generate the vibration driving signal, based on at least one of the touch sensing signal and the force sensing signal, and may provide the vibration driving signal to the one or more piezoelectric members 500. The vibration driver 630 may generate the vibration driving signal, based on control by the controller 650, and may provide the vibration driving signal to the one or more piezoelectric members 500. The vibration driver 630 may generate the vibration driving signal on system notification (for example, low battery, memory deficiency, security notification, etc.), message or telephone reception, program notification, in addition to a touch operation, but aspects of the present disclosure are not limited thereto.

The switching circuit part 640 may be between the one or more piezoelectric members 500 and each of the force sensing part 620 and the vibration driver 630. The switching circuit part 640 may be controlled by the controller 650 so that the force sensing part 620 and the vibration driver 630 are driven. For example, the switching circuit part 640 may be controlled by the controller 650 so that the force sensing part 620 and the vibration driver 630 are time-divisionally driven.

The controller 650 may be configured to control the touch sensing part 610, the force sensing part 620, and the vibration driver 630. The controller 650 may generate a control signal which controls driving of the touch sensing part 610, the force sensing part 620, and the vibration driver 630 and may transfer the generated control signal to each of the touch sensing part 610, the force sensing part 620, and the vibration driver 630. The controller 650 may control the switching circuit part 640 so that the force sensing part 620 and the vibration driver 630 are driven. For example, the controller 650 may control the switching circuit part 640 so that the force sensing part 620 and the vibration driver 630 are time-divisionally driven. The controller 650 may control the switching circuit part 640 to selectively connect the force sensing part 620 and the vibration driver 630 with the one or more piezoelectric members 500. For example, the controller 650 may control the switching circuit part 640 to electrically connect the force sensing part 620 with the one or more piezoelectric members 500. Also, the controller 650 may control the switching circuit part 640 to electrically connect the vibration driver 630 with the one or more piezoelectric members 500.

As illustrated in FIGS. 9 to 11, while the vibration driver 630 does not perform vibration generation driving, the controller 650 may control the switch circuit part 640 to electrically connect the one or more piezoelectric members 500 with a sensing channel of the force sensing part 620. While the vibration driver 630 does not perform vibration generation driving, the controller 650 may control the switch circuit part 640 to maintain an electrical connection between the one or more piezoelectric members 500 and the force sensing part 620. While the one or more piezoelectric members 500 is connected with the force sensing part 620, the force sensing part 620 may perform force sensing driving FSD, and the vibration driver 630 may maintain an operation standby state (Wait).

Moreover, when a condition for the vibration generation driving of the vibration driver 630 is satisfied, the controller 650 may control the switching circuit part 640 to electrically connect the one or more piezoelectric members 500 with the vibration channel of the vibration driver 630. While vibration generation driving of the vibration driver 630 is being performed, the controller 650 may maintain an electrical connection between the one or more piezoelectric members 500 and the vibration driver 630 by the switching circuit part 640. While the one or more piezoelectric members 500 is connected with the vibration driver 630, the vibration driver 630 may perform vibration generation driving HWD, and the force sensing part 620 may stop or stand by (Wait) force sensing driving.

Figure 12:
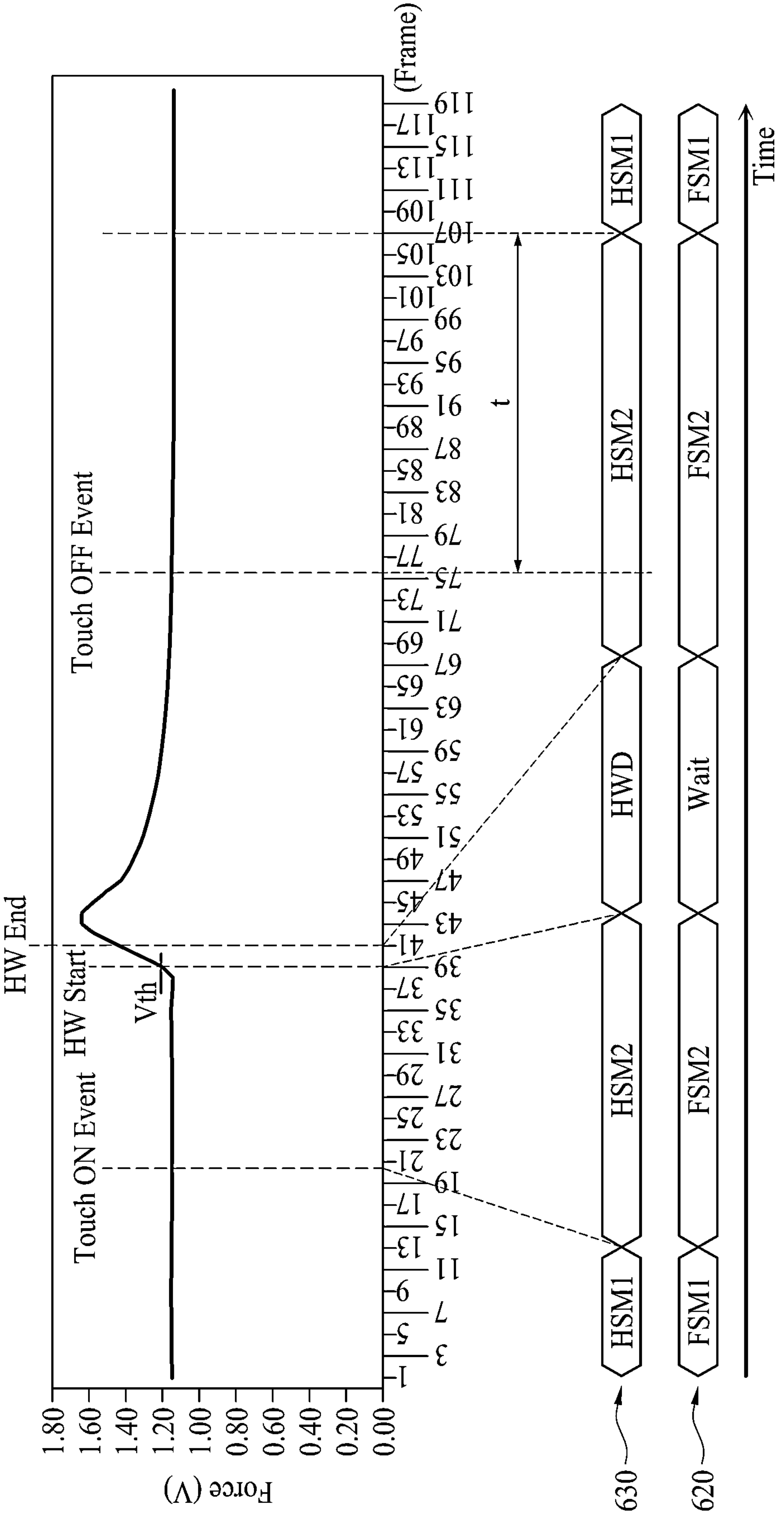
FIG. 12 illustrates diagrams for describing a driving operation of a touch driving circuit according to another aspect of the present disclosure.

FIG. 12 illustrates diagrams for describing a driving operation of a touch driving circuit 600 according to another aspect of the present disclosure.

Referring to FIG. 12, the touch driving circuit 600 according to another aspect of the present disclosure may be configured to sense at least one of a touch and a pressure of a display apparatus or a display member and provide a haptic feedback vibration to the display apparatus, based on at least one of the touch and the pressure.

An operation of each of the force sensing part 620 and the vibration driver 630 may be controlled based on a touch sensing signal or touch sensing data of the touch sensing part 610. An operation each of the force sensing part 620 and the vibration driver 630 may be controlled according to a control signal of the controller 650 based on the touch sensing signal or the touch sensing data of the touch sensing part 610. For example, the force sensing part 620 may be driven in the first force sensing mode FSM1 or the second force sensing mode FSM2, based on at least one of the touch sensing signal and the touch sensing data of the touch sensing part 610. Also, the vibration driver 630 may be driven in the first vibration standby mode HSM1 or the second vibration standby mode HSM2, based on at least one of the touch sensing signal and the touch sensing data of the touch sensing part 610. For example, the vibration driver 630 may be driven in the first vibration standby mode HSM1 or the second vibration standby mode HSM2, based on at least one of a touch sensing signal or touch sensing data of the touch sensing part 610 and a force sensing signal or force sensing data of the force sensing part 620. For example, the first vibration standby mode HSM1 may perform a low power operation of stopping or minimizing an operation of the vibration driver 630 so as to reduce a standby power or a consumption power of the display apparatus and may be referred to as an idle standby mode, a low power standby mode, or a deactivation sensing mode (or deactivation mode), but aspects of the present disclosure are not limited to the terms. Also, the second vibration standby mode HSM2 may be a pre-preparation operation for performing a vibration generating operation by the vibration driver 630. For example, the vibration driver 630 may generate a vibration driving signal which is to be supplied to the one or more piezoelectric members 500, during the second vibration standby mode HSM2. For example, the vibration driving signal may have various types such as a square wave, a triangle wave, or a sine wave. The vibration driving signal may be a signal which has a specific waveform without maintaining one voltage level, and thus, a delay phenomenon may occur in a process of generating the signal. Alternatively, the vibration driving signal may be a signal which has different vibration waveforms, based on at least one of a position (or region) of a touch input and a pressure (or force) of the touch input, and thus, a preparation operation of generating the signal may be needed. Accordingly, the vibration driver 630 may generate the vibration driving signal in the second vibration standby mode HSM2, so that a delay phenomenon of vibration generation driving is reduced or minimized. For example, the second vibration standby mode HSM2 may be referred to as a pre-preparation mode, a post-preparation mode, a pre-standby mode, a post-standby mode, or a vibration driving preparation mode, but aspects of the present disclosure are not limited thereto. For example, the first force sensing mode FSM1 of the force sensing part 620 may overlap the first vibration standby mode HSM1 of the vibration driver 630. Also, the second force sensing mode FSM2 of the force sensing part 620 may overlap the second vibration standby mode HSM2 of the vibration driver 630. For example, a force sensing operation of the force sensing part 620 and a vibration standby operation of the vibration driver 630 may be synchronized with each other and driven.

While force sensing driving is in the first force sensing mode FSM1, when a touch on event occurs where a user touch is recognized by the touch sensing part 610 or the controller 650, the force sensing part 620 may be changed from the first force sensing mode FSM1 to the second force sensing mode FSM2. Also, while vibration standby driving is in the first vibration standby mode HSM1, when the touch on event occurs where a user touch is recognized by the touch sensing part 610 or the controller 650, the vibration driver 630 may be changed from the first vibration standby mode HSM1 to the second vibration standby mode HSM2.

During the second vibration standby mode HSM2, when the force sensing signal or the force sensing data of the force sensing part 620 is greater than a force threshold value Vth, the vibration driver 630 may operate in a vibration driving mode HWD which outputs the vibration driving signal to the one or more piezoelectric members 500. For example, the vibration driving mode HWD of the vibration driver 630 may be performed based on control by the controller 650. The controller 650 may control the switching circuit part 640 to block an electrical connection between the one or more piezoelectric members 500 and the force sensing part 620 and electrically connect the one or more piezoelectric members 500 with the vibration driver 630. The vibration driver 630 may be electrically connected with the one or more piezoelectric members 500 and may supply the vibration driving signal to the one or more piezoelectric members 500 to vibrate the one or more piezoelectric members 500.

At this time, an electrical connection between the force sensing part 620 and the one or more piezoelectric members 500 may be blocked, and force sensing driving may stop or stand by.

According to an aspect of the present disclosure, the vibration driver 630 may include the vibration driving mode HWD which outputs the vibration driving signal, based on at least one of the force sensing signal or the force sensing data of the force sensing part 620. Also, in the vibration driving mode HWD of the vibration driver 630, force sensing driving of the force sensing part 620 may stop or stand by (Wait).

According to an aspect of the present disclosure, as the force sensing signal or the force sensing data is greater than a threshold value (or the force threshold value) Vth, the vibration driver 630 may be changed from the second vibration standby mode HSM2 to the vibration driving mode HWD. Also, force sensing driving of the force sensing part 620 may stop or stand by in synchronization with changing of the vibration driving mode HWD. When the vibration driving mode HWD of the vibration driver 630 is completed, each of the force sensing part 620 and the vibration driver 630 may be changed to a previous driving mode. After the vibration driver 630 is driven in the vibration driving mode HWD, the vibration driver 630 may be changed to the second vibration standby mode HSM2, and the force sensing part 620 may be changed to the second force sensing mode FSM2 in synchronization with changing of the second vibration standby mode HSM2. For example, the force sensing part 620 may be changed to the second force sensing mode FSM2 in a standby state, and the vibration driver 630 may be changed from the vibration driving mode HWD to the second vibration standby mode HSM2. For example, changing of a driving mode of each of the force sensing part 620 and the vibration driver 630 may be performed based on control by the controller 650. The controller 650 may control the switching circuit part 640 to block an electrical connection between the one or more piezoelectric members 500 and the vibration driver 630 and may electrically connect the one or more piezoelectric members 500 with the force sensing part 620.

In the second force sensing mode FSM2, based on the touch sensing signal, the touch sensing part 610 may be changed to the deactivation mode, and then, the force sensing part 620 may be changed to the first force sensing mode FSM1. Also, the vibration driver 630 may be changed to the first vibration standby mode HSM1 in synchronization with changing of the first force sensing mode FSM1. For example, in the second force sensing mode FSM2, when a touch off event occurs where the user touch is released by the touch sensing part 610 or the controller 650, the force sensing part 620 may be changed to the first force sensing mode FSM1 after a certain time t elapses. Also, in the second vibration standby mode HSM2, when the touch off event occurs where the user touch is released by the touch sensing part 610 or the controller 650, the vibration driver 630 may be changed to the first vibration standby mode HSM1 after the certain time t elapses. For example, a change time of a driving mode of the force sensing part 620 may be synchronized with a change time of a driving mode of the vibration driver 630.

According to an aspect of the present disclosure, in the second force sensing mode FSM2, when the touch sensing part 610 is changed to the activation mode within a certain time after the touch sensing part 610 is changed to the deactivation mode, the force sensing part 620 may maintain the second force sensing mode FSM2, and the vibration drive 630 may maintain the second vibration standby mode HSM2.

According to another aspect of the present disclosure, force sensing and a haptic feedback vibration may be implemented or realized by the one or more piezoelectric members 500 in common, and thus, an effect of unimaterialization may be obtained. Also, the force sensing part 620 and the vibration driver 630 may be respectively changed from the first force sensing mode FSM1 and the first vibration standby mode HSM1 to the second force sensing mode FSM2 and the second vibration standby mode HSM2 in synchronization with a touch condition of the user (for example, the touch on event), and thus, the load and power consumption of a processor may be efficiently reduced. Also, the vibration driver 630 may previously generate the vibration driving signal for vibration generation driving through the second vibration standby mode HSM2, and thus, a delay phenomenon of vibration generation driving may be reduced or minimized.

According to another aspect of the present disclosure, each of the force sensing part 620 and the vibration driver 630 may have an observance time corresponding to the certain time t without immediate changing of a driving mode, in synchronization with the touch condition of the user (for example, the touch off event), and thus, instead of that a touch is temporarily performed only once, immediate force sensing driving and vibration generation driving may be possible in a fast repetition touch operation, thereby improving a latency characteristic and the stability of force sensing and vibration generation.

Figure 13:
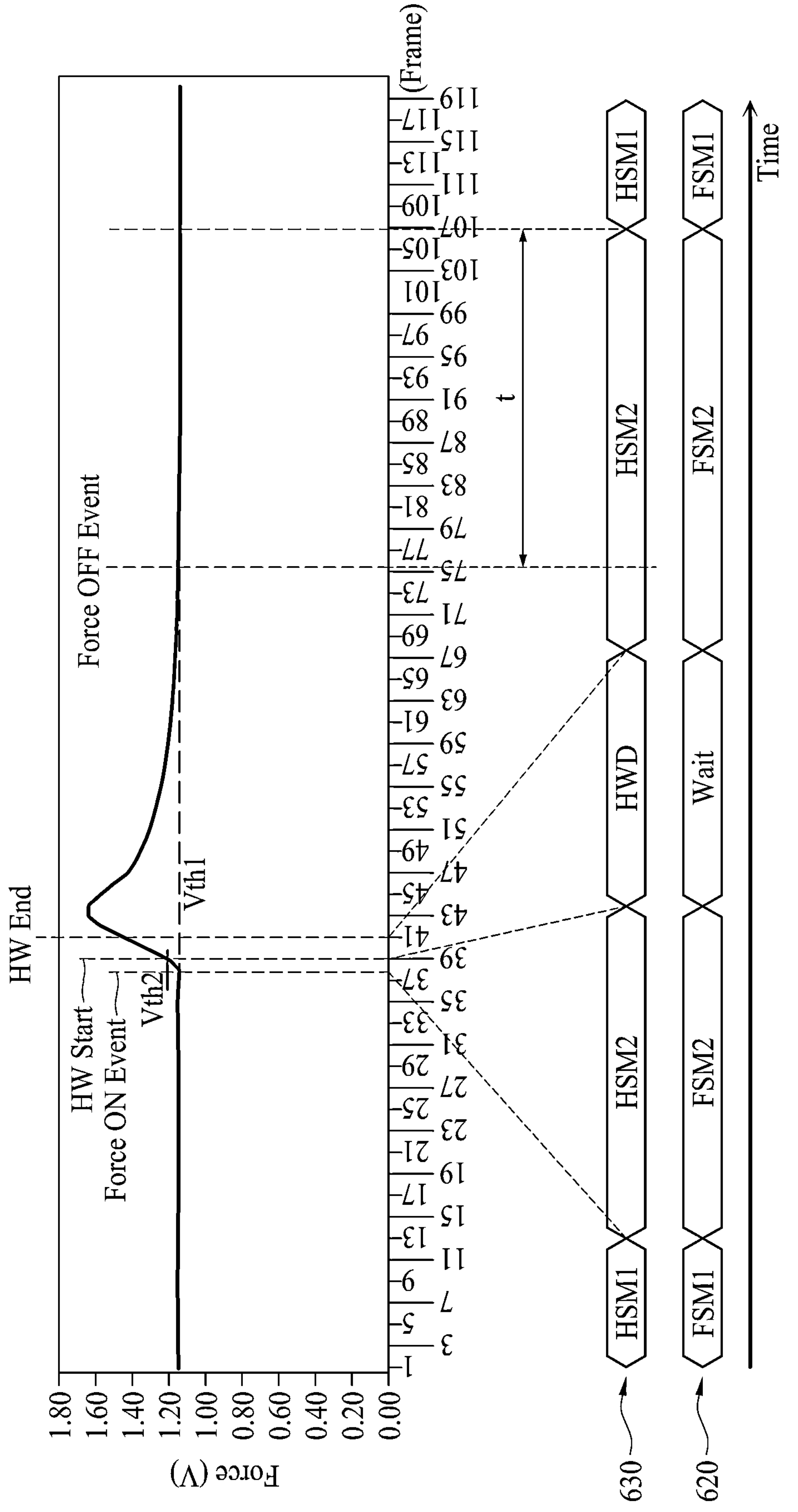
FIG. 13 illustrates diagrams for describing a driving operation of a touch driving circuit according to another aspect of the present disclosure.

FIG. 13 illustrates diagrams for describing a driving operation of a touch driving circuit 600 according to another aspect of the present disclosure.

Referring to FIG. 13, the touch driving circuit 600 according to another aspect of the present disclosure may be configured to sense a touch pressure of a display apparatus and provide a haptic feedback vibration to the display apparatus, based on the touch pressure. The touch driving circuit 600 may be a touch driver, but aspects of the present disclosure are not limited thereto.

An operation of each of the force sensing part 620 and the vibration driver 630 may be controlled based on a force sensing signal or force sensing data of the force sensing part 620. An operation each of the force sensing part 620 and the vibration driver 630 may be controlled according to a control signal of the controller 650 based on the force sensing signal or the force sensing data of the force sensing part 620. For example, the force sensing part 620 may be driven in the first force sensing mode FSM1 or the second force sensing mode FSM2, based on the force sensing signal received from the one or more piezoelectric members 500. Also, the vibration driver 630 may be driven in the first vibration standby mode HSM1 or the second vibration standby mode HSM2, based on the force sensing signal or the force sensing data of the force sensing part 620. For example, the first vibration standby mode HSM1 may perform a low power operation of stopping or minimizing an operation of the vibration driver 630 so as to reduce a standby power or a consumption power of the display apparatus and may be referred to as an idle standby mode, a low power standby mode, or a deactivation sensing mode (or deactivation mode), but aspects of the present disclosure are not limited to the terms. Also, the second vibration standby mode HSM2 may be a pre-preparation operation for performing a vibration generating operation by the vibration driver 630. For example, the vibration driver 630 may generate a vibration driving signal which is to be supplied to the one or more piezoelectric members 500, during the second vibration standby mode HSM2. For example, the vibration driving signal may have various types such as a square wave, a triangle wave, or a sine wave. The vibration driving signal may be a signal which has a specific waveform without maintaining one voltage level, and thus, a delay phenomenon may occur in a process of generating the signal. Alternatively, the vibration driving signal may be a signal which has different vibration waveforms, based on at least one of a position (or region) of a touch input and a pressure (or force) of the touch input, and thus, a preparation operation of generating the signal may be needed. Accordingly, the vibration driver 630 may generate the vibration driving signal in the second vibration standby mode HSM2, so that a delay phenomenon of vibration generation driving is reduced or minimized. For example, the second vibration standby mode HSM2 may be referred to as a pre-preparation mode, a post-preparation mode, a pre-standby mode, a post-standby mode, or a vibration driving preparation mode, but aspects of the present disclosure are not limited thereto. For example, the first force sensing mode FSM1 of the force sensing part 620 may overlap the first vibration standby mode HSM1 of the vibration driver 630. Also, the second force sensing mode FSM2 of the force sensing part 620 may overlap the second vibration standby mode HSM2 of the vibration driver 630. For example, a force sensing operation of the force sensing part 620 and a vibration standby operation of the vibration driver 630 may be synchronized with each other and driven.

While force sensing driving is in the first force sensing mode FSM1, when the force sensing signal received from the one or more piezoelectric members 500 is greater than a first force threshold value Vth1, the force sensing part 620 may determine that a force on event where a touch pressure of a user is recognized occurs and may be changed from the first force sensing mode FSM1 to the second force sensing mode FSM2. Also, while vibration standby driving is in the first vibration standby mode HSM1, when the force on event occurs due to the force sensing part 620, the vibration driver 630 may be changed from the first vibration standby mode HSM1 to the second vibration standby mode HSM2.

During the second vibration standby mode HSM2, when the force sensing signal or the force sensing data of the force sensing part 620 is greater than a second force threshold value Vth2, the vibration driver 630 may operate in a vibration driving mode HWD which outputs the vibration driving signal to the one or more piezoelectric members 500. For example, the vibration driving mode HWD of the vibration driver 630 may be performed based on control by the controller 650. The controller 650 may control the switching circuit part 640 to block an electrical connection between the one or more piezoelectric members 500 and the force sensing part 620 and electrically connect the one or more piezoelectric members 500 with the vibration driver 630. The vibration driver 630 may be electrically connected with the one or more piezoelectric members 500 and may supply the vibration driving signal to the one or more piezoelectric members 500 to vibrate the one or more piezoelectric members 500. At this time, an electrical connection between the force sensing part 620 and the one or more piezoelectric members 500 may be blocked, and force sensing driving may stop or stand by (Wait). For example, while vibration generation driving of the one or more piezoelectric members 500 is being performed, force sensing driving of the force sensing part 620 may stop or stand by (Wait). For example, based on vibration generation driving of the one or more piezoelectric members 500, force sensing driving of the force sensing part 620 may stop or stand by (Wait).

When the vibration driving mode HWD of the vibration driver 630 is completed, each of the force sensing part 620 and the vibration driver 630 may be changed to a previous driving mode. The force sensing part 620 may be changed from a standby state to the second force sensing mode FSM2, and the vibration driver 630 may be changed from the vibration driving mode HWD from the second vibration standby mode HSM2. For example, changing of a driving mode of each of the force sensing part 620 and the vibration driver 630 may be performed based on control by the controller 650. The controller 650 may control the switching circuit part 640 to block an electrical connection between the one or more piezoelectric members 500 and the vibration driver 630 and may electrically connect the one or more piezoelectric members 500 with the force sensing part 620.

In the second force sensing mode FSM2, when the force sensing signal received from the one or more piezoelectric members 500 is less than or equal to the first force threshold value Vth1, the force sensing part 620 may determine that the force off event where the touch pressure of the user is released occurs and may be changed to the first force sensing mode FSM1 after a certain time t elapses. Also, in the second force sensing mode FSM2, when the force off event occurs due to the force sensing part 620, the vibration driver 630 may be changed to the first vibration standby mode HSM1 after the certain time t elapses. For example, a change time of a driving mode of the force sensing part 620 may be synchronized with a change time of a driving mode of the vibration driver 630.

According to another aspect of the present disclosure, force sensing and a haptic feedback vibration may be implemented or realized by the one or more piezoelectric members 500 in common, and thus, an effect of uni-materialization may be obtained. Also, the force sensing part 620 and the vibration driver 630 may be respectively changed from the first force sensing mode FSM1 and the first vibration standby mode HSM1 to the second force sensing mode FSM2 and the second vibration standby mode HSM2 in synchronization with a touch pressure condition of the user (for example, the force on event), and thus, the load and power consumption of a processor may be efficiently reduced. Also, the vibration driver 630 may previously generate the vibration driving signal for vibration generation driving through the second vibration standby mode HSM2, and thus, a delay phenomenon of vibration generation driving may be reduced or minimized.

According to another aspect of the present disclosure, each of the force sensing part 620 and the vibration driver 630 may have an observance time corresponding to the certain time t without immediate changing of a driving mode, in synchronization with the touch pressure condition of the user (for example, the force off event), and thus, instead of that a touch is temporarily performed only once, immediate force sensing driving and vibration generation driving may be possible in a fast repetition touch operation, thereby improving a latency characteristic and the stability of force sensing and vibration generation.

Figure 14:
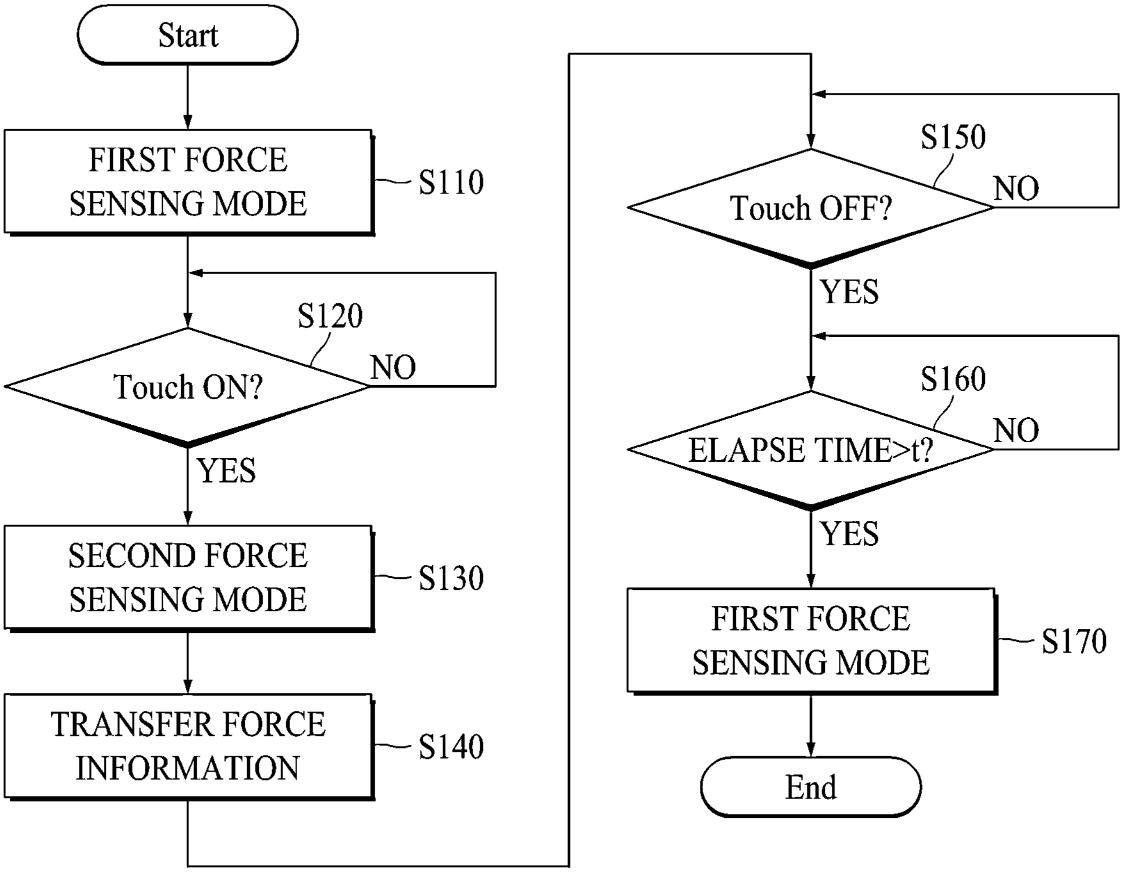
FIG. 14 is a flowchart illustrating a driving method of a touch driving circuit according to an aspect of the present disclosure.

FIG. 14 is a flowchart illustrating a driving method of a touch driving circuit according to an aspect of the present disclosure.

Referring to FIG. 14, a driving method of the force sensing part 620 in the touch driving circuit 600 according to an aspect of the present disclosure, force sensing driving of the force sensing part 620 may be performed in the first force sensing mode in step S110. In the first force sensing mode, force sensing may be performed under a driving condition for reducing a standby power or a consumption power of a display apparatus. For example, force sensing based on the first force sensing mode may be performed with a driving frequency of 30 Hz, but aspects of the present disclosure are not limited thereto. The force sensing part 620 may not transfer a force sensing signal or force sensing data to the controller 650 during the first force sensing mode. For example, the force sensing part 620 may deactivate a function of the communication interface during the first force sensing mode. For example, the first force sensing mode may be referred to as an idle sensing mode, a low power sensing mode, a low speed sensing mode, or a deactivation sensing mode (or deactivation mode), but aspects of the present disclosure are not limited to the terms.

In step S120, the force sensing part 620 may determine whether a touch on event occurs where a user touch is recognized by the touch sensing part 610 or the controller 650 during the first force sensing mode.

In step S130, when the touch on event occurs as a result of the determination of step S120, the force sensing part 620 may be changed from the first force sensing mode to the second force sensing mode. Force sensing based on the second force sensing mode may be performed under a driving condition for increasing the accuracy of sensing of a touch or a pressure (or force) of the user. For example, the force sensing based on the second force sensing mode may be performed with a driving frequency of 120 Hz or more, but aspects of the present disclosure are not limited thereto. In the second force sensing mode, the force sensing part 620 may transfer the force sensing signal or the force sensing data to the controller 650. For example, the force sensing part 620 may activate a function of the communication interface during the second force sensing mode. For example, the second force sensing mode may be referred to as a run sensing mode, a normal sensing mode, a high speed sensing mode, or an activation sensing mode (or activation mode), but aspects of the present disclosure are not limited to the terms.

In step S140, the force sensing part 620 may transfer the force sensing signal or the force sensing data to the controller 650 in the second force sensing mode.

In step S150, the force sensing part 620 may determine whether a touch off event occurs where a user touch is released by the touch sensing part 610 or the controller 650, during the second force sensing mode.

In step S160, when the touch off event occurs as a result of the determination of step S150, the force sensing part may determine whether a certain time elapses. For example, the force sensing part 620 may count the number of samplings of the ADC of the force sensing part 620 and may determine whether a count number is more than a predetermined number t. Alternatively, the force sensing part 620 may count the elapse of time and may determine whether a count time is greater than a predetermined time t.

In step S170, when the certain time elapses as a result of the determination of step S160, force sensing driving of the force sensing part 620 may be changed from the second force sensing mode to the first force sensing mode.

In the driving method of the touch driving circuit according to an aspect of the present disclosure, the force sensing part 620 may be changed from the first force sensing mode to the second force sensing mode in synchronization with a touch condition of the user (for example, the touch on event), thereby efficiently decreasing the load and power consumption of a processor. Also, the force sensing part 620 may have an observance time corresponding to the certain time t without immediate changing of a driving mode, in synchronization with a touch condition of the user (for example, the touch off event), and thus, instead of that a touch is temporarily performed only once, immediate force sensing driving and vibration generation driving may be possible in a fast repetition touch operation, thereby improving a latency characteristic and the stability of force sensing and vibration generation.

Figure 15:
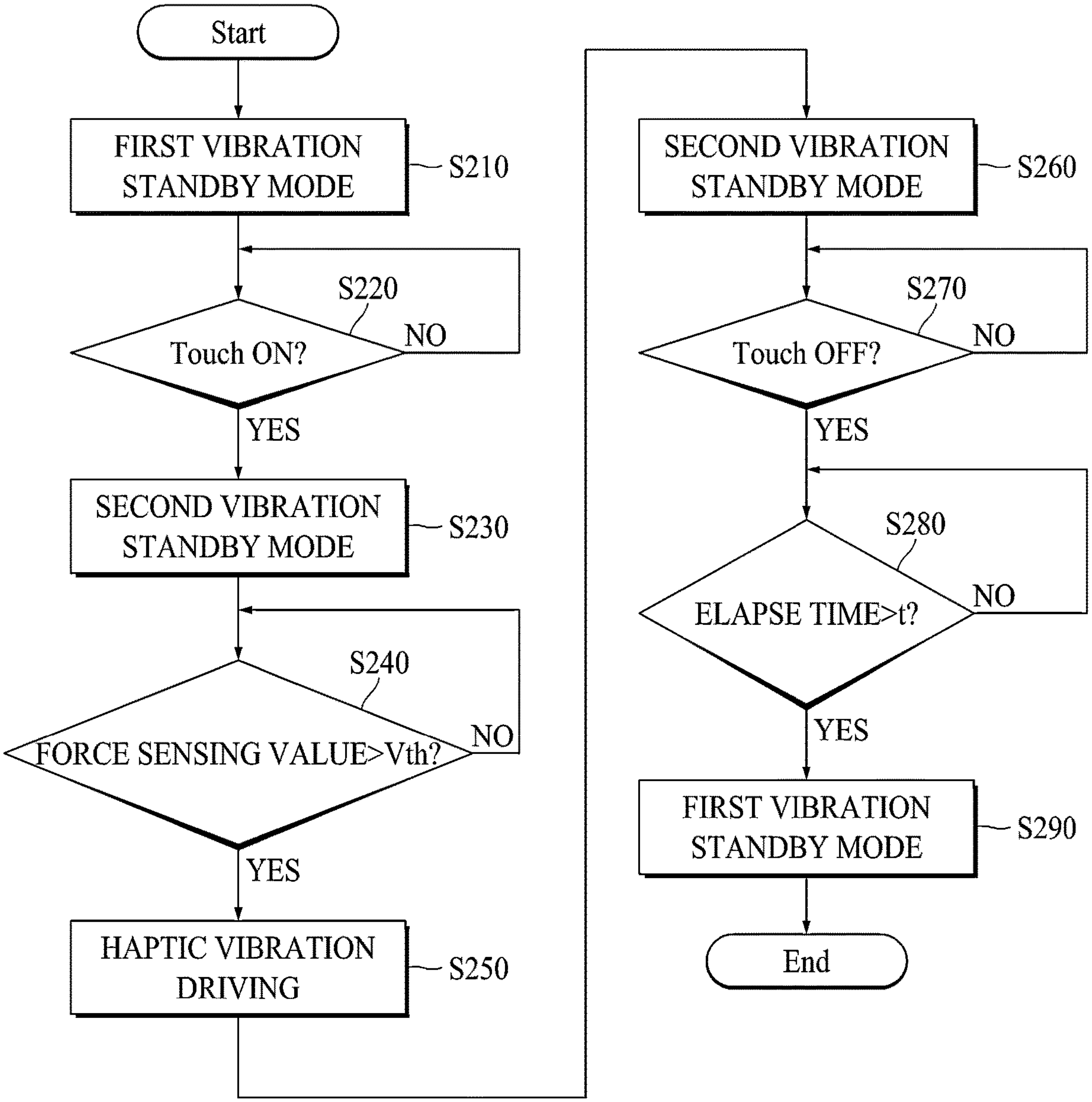
FIG. 15 is a flowchart illustrating a driving method of a touch driving circuit according to another aspect of the present disclosure.

FIG. 15 is a flowchart illustrating a driving method of a touch driving circuit according to another aspect of the present disclosure.

Referring to FIG. 15, a driving method of the vibration driver 630 in the touch driving circuit 600 according to an aspect of the present disclosure, the vibration driver 630 may be driven in the first vibration standby mode in step S210. For example, the first vibration standby mode may perform a low power operation of stopping or minimizing an operation of the vibration driver 630 so as to reduce a standby power or a consumption power of the display apparatus and may be referred to as an idle standby mode, a low power standby mode, or a deactivation sensing mode (or deactivation mode), but aspects of the present disclosure are not limited to the terms.

In step S220, the vibration driver 630 may determine whether a touch on event occurs where a touch input or a touch pressure (or force) of a user is recognized by the touch sensing part 610, the force sensing part 620, or the controller 650 during the first vibration standby mode.

In step S230, when the touch on event occurs as a result of the determination of step S220, the vibration driver 630 may be changed from the first vibration standby mode to the second vibration standby mode. The second vibration standby mode may be a pre-preparation operation for performing a vibration generating operation by the vibration driver 630. For example, the vibration driver 630 may generate a vibration driving signal which is to be supplied to the one or more piezoelectric members 500, during the second vibration standby mode. For example, the second vibration standby mode may be referred to as a pre-preparation mode, a post-preparation mode, a pre-standby mode, a post-standby mode, or a vibration driving preparation mode, but aspects of the present disclosure are not limited thereto.

In step S240, the vibration driver 630 may determine whether a force sensing value based on the force sensing part 620 is greater than a force threshold value Vth, during the second vibration standby mode.

In step S250, when the force sensing value is greater than the force threshold value Vth as a result of the determination of step S240, the vibration driver 630 may provide a vibration driving signal to the one or more piezoelectric members 500 to vibrate the one or more piezoelectric members 500. A haptic feedback vibration may be provided to the user, based on a vibration of the one or more piezoelectric members 500.

In step S260, when vibration generation driving is completed, the vibration driver 630 may be changed to a previous driving mode. The vibration driver 630 may be changed to the second vibration standby mode.

In step S270, the vibration driver 630 may determine whether a touch off event occurs where a touch input or a touch pressure (or force) of the user is released by the touch sensing part 610, the force sensing part 620, or the controller 650 during the second vibration standby mode.

In step S280, when the touch off event occurs as a result of the determination of step S270, the vibration driver 630 may determine whether a certain time elapses. For example, the vibration driver 630 may determine whether a certain time is greater than a predetermined time t or the number of samplings t.

In step S290, when the certain time elapses as a result of the determination of step S280, the vibration driver 630 may be changed from the second vibration standby mode to the first vibration standby mode.

In the driving method of the touch driving circuit according to an aspect of the present disclosure, the vibration driver 630 may be changed from the first vibration standby mode to the second vibration standby mode in synchronization with a touch condition of the user (for example, the touch on event), thereby efficiently decreasing the load and power consumption of a processor. Also, the vibration driver 630 may previously generate the vibration driving signal for vibration generation driving through the second vibration standby mode, and thus, a delay phenomenon of vibration generation driving may be reduced or minimized. Also, the vibration driver 630 may have an observance time corresponding to the certain time t without immediate changing of a driving mode, in synchronization with a touch condition of the user (for example, the touch off event), and thus, instead of that a touch is temporarily performed only once, immediate vibration generation driving may be possible in a fast repetition touch operation, thereby improving a latency characteristic and the stability of haptic feedback driving.

A touch driving circuit and a display apparatus including the same according to various aspects of the present disclosure will be described below.

A touch driving circuit according to various aspects of the present disclosure may include a touch sensing part configured to sense a touch, and a force sensing part configured to sense a force. Force sensing driving of the force sensing part may be controlled based on a touch sensing signal of the touch sensing part.

According to various aspects of the present disclosure, the force sensing part may be driven in a first force sensing mode or a second force sensing mode, based on the touch sensing signal.

According to various aspects of the present disclosure, a driving frequency of the first force sensing mode may differ from a driving frequency of the second force sensing mode, or may be lower than a driving frequency of the second force sensing mode.

According to various aspects of the present disclosure, the driving frequency may be a sampling frequency of an analog-to-digital converter included in the force sensing part.

According to various aspects of the present disclosure, the force sensing part may do not transfer a force sensing signal in the first force sensing mode.

According to various aspects of the present disclosure, the force sensing part may transfer a force sensing signal in the second force sensing mode.

According to various aspects of the present disclosure, the touch driving circuit may further comprise a controller configured to control the touch sensing part to an activation mode or a deactivation mode, based on the touch sensing signal.

According to various aspects of the present disclosure, in the second force sensing mode, the force sensing part may transfer a force sensing signal to the controller, based on the touch sensing signal of the touch sensing part.

According to various aspects of the present disclosure, in the second force sensing mode, the force sensing part may do not transfer a force sensing signal, based on the touch sensing signal of the touch sensing part.

According to various aspects of the present disclosure, in the second force sensing mode, the force sensing part may determine whether to transfer a force sensing signal, based on the touch sensing signal of the touch sensing part.

According to various aspects of the present disclosure, the force sensing part may maintain the second force sensing mode, based on the touch sensing signal of the touch sensing part.

According to various aspects of the present disclosure, in the second force sensing mode, the force sensing part may be changed to the first force sensing mode after the touch sensing part is changed to the deactivation mode.

According to various aspects of the present disclosure, the first force sensing mode may be changed after a certain time elapses, and the certain time may be counted from a change time of the deactivation mode of the touch sensing part.

According to various aspects of the present disclosure, the force sensing part may be changed to the first force sensing mode after a certain time elapses after the touch sensing part is changed to the deactivation mode.

According to various aspects of the present disclosure, the certain time may be counted from a time at which the touch sensing part is changed to the deactivation mode.

According to various aspects of the present disclosure, in the second force sensing mode, when the touch sensing part is changed to the activation mode within a certain time after the touch sensing part is changed to the deactivation mode, the force sensing part may maintain the second force sensing mode.

According to various aspects of the present disclosure, the certain time may be counted from a time at which the touch sensing part is changed to the deactivation mode.

According to various aspects of the present disclosure, the force sensing part may receive the touch sensing signal from the touch sensing part.

According to various aspects of the present disclosure, the touch driving circuit may further comprise a controller configured to control the touch sensing part and the force sensing part. The force sensing part may receive the touch sensing signal from the controller.

According to various aspects of the present disclosure, the force sensing part may receive a data packet, including the touch sensing signal through a communication interface.

According to various aspects of the present disclosure, may further include a piezoelectric member including a piezoelectric material. The force sensing part may be configured to sense a force sensing signal based on a strain of the piezoelectric member.

According to various aspects of the present disclosure, the touch driving circuit may further comprise a vibration driver configured to generate a vibration driving signal, based on at least one of the touch sensing signal and the force sensing signal, and provide the vibration driving signal to the piezoelectric member, a switching circuit part between the piezoelectric member and each of the force sensing part and the vibration driver and a controller configured to control the switching circuit part to drive the force sensing part and the vibration driver.

According to various aspects of the present disclosure, the force sensing part and the vibration driver may be time-divisionally driven.

According to various aspects of the present disclosure, the controller may be configured to control the switching circuit part to selectively connect the force sensing part and the vibration driver with the piezoelectric member.

According to various aspects of the present disclosure, the force sensing part may be driven in the first force sensing mode or the second force sensing mode, based on the touch sensing signal. The vibration driver may be driven in a first vibration standby mode or a second vibration standby mode, based on the touch sensing signal.

According to various aspects of the present disclosure, the first force sensing mode may overlap the first vibration standby mode.

According to various aspects of the present disclosure, the second force sensing mode may overlap the second vibration standby mode.

According to various aspects of the present disclosure, the vibration driver may include a vibration driving mode which outputs the vibration driving signal, based on the force sensing signal. The force sensing driving of the force sensing part may stop in the vibration driving mode of the vibration driver.

According to various aspects of the present disclosure, as the force sensing signal is greater than a threshold value, the vibration driver may be changed from the second vibration standby mode to the vibration driving mode. The force sensing driving of the force sensing part may stop in synchronization with changing of the vibration driving mode.

According to various aspects of the present disclosure, the vibration driver may be changed to the second vibration standby mode after the vibration driving mode is completed. The force sensing part may be changed to the second force sensing mode in synchronization with changing of the second vibration standby mode.

According to various aspects of the present disclosure, in the second force sensing mode, the force sensing part may be changed to the first force sensing mode after the touch sensing part is changed to the deactivation mode, based on the touch sensing signal. The vibration driver may be changed to the first vibration standby mode in synchronization with changing of the first force sensing mode.

According to various aspects of the present disclosure, in the second force sensing mode, when the touch sensing part is changed to the activation mode within a certain time after the touch sensing part is changed to the deactivation mode, the force sensing part may maintain the second force sensing mode. The vibration driver may maintain the second vibration standby mode.

A touch driving circuit according to various aspects of the present disclosure may include a piezoelectric member including a piezoelectric material, a force sensing part connected with the piezoelectric member to sense a force based on a strain of the piezoelectric member, a vibration driver configured to generate a vibration driving signal which controls vibration generation driving of the piezoelectric member, and a controller configured to control the force sensing part and the vibration driver. The vibration generation driving of the vibration driver may be controlled based on a force sensing signal of the force sensing part.

According to various aspects of the present disclosure, the touch driving circuit may further include a switching circuit part between the piezoelectric member and each of the force sensing part and the vibration driver. The controller may control the switching circuit part to drive the force sensing part and the vibration driver.

According to various aspects of the present disclosure, force sensing driving of the force sensing part may stop based on the vibration generation driving of the piezoelectric member.

According to various aspects of the present disclosure, the touch driving circuit may further include a touch sensing part controlled by the controller to sense a touch. Force sensing driving of the force sensing part may be controlled based on the touch sensing signal of the touch sensing part.

According to various aspects of the present disclosure, the force sensing part may be driven in a first force sensing mode or a second force sensing mode, based on the touch sensing signal. The vibration driver may be driven in a first vibration standby mode or a second vibration standby mode, based on at least one of the touch sensing signal and the force sensing signal.

According to various aspects of the present disclosure, the first force sensing mode may overlap the first vibration standby mode.

According to various aspects of the present disclosure, the vibration driver may include a vibration driving mode which outputs the vibration driving signal, based on the force sensing signal. The force sensing driving of the force sensing part may stop in the vibration driving mode of the vibration driver.

According to various aspects of the present disclosure, as the force sensing signal is greater than a threshold value, the vibration driver may be changed from the second vibration standby mode to the vibration driving mode. The force sensing driving of the force sensing part may stop in synchronization with changing of the vibration driving mode.

According to various aspects of the present disclosure, the vibration driver may be changed to the second vibration standby mode after the vibration driving mode is completed. The force sensing part may be changed to the second force sensing mode in synchronization with changing of the second vibration standby mode.

According to various aspects of the present disclosure, in the second force sensing mode, the force sensing part may be changed to the first force sensing mode after the touch sensing part is changed to the deactivation mode, based on the touch sensing signal. The vibration driver may be changed to the first vibration standby mode in synchronization with changing of the first force sensing mode.

According to various aspects of the present disclosure, in the second force sensing mode, when the touch sensing part is changed to the activation mode within a certain time after the touch sensing part is changed to the deactivation mode, the force sensing part may maintain the second force sensing mode. The vibration driver may maintain the second vibration standby mode.

A display apparatus according to an aspect of the present disclosure may comprise a display member configured to display an image, and a touch driver connected with the display member. The touch driver may include a touch driving circuit. The touch driving circuit may include a touch sensing part configured to sense a touch, a force sensing part configured to sense a force, and a controller configured to control the touch sensing part and the force sensing part. Force sensing driving of the force sensing part may be controlled based on a touch sensing signal of the touch sensing part.

According to various aspects of the present disclosure, the touch driver may sense at least one of a touch and a pressure of the display member.

According to various aspects of the present disclosure, the touch driver may sense at least one of the touch and the pressure of the display member and may provide a haptic feedback vibration to the display member, based on at least one of the touch and the pressure.

According to various aspects of the present disclosure, the display member may include a display panel including a plurality of pixels configured to display the image, and at least one piezoelectric member connected with a rear surface of the display panel.

According to various aspects of the present disclosure, the display member may further include a touch panel connected with the display panel to sense a touch.

According to various aspects of the present disclosure, the display panel may include a plurality of areas. The at least one piezoelectric member may include a plurality of piezoelectric members respectively disposed in the plurality of areas. The touch driver may individually control each of the plurality of piezoelectric members.

A display apparatus according to an aspect of the present disclosure may comprise a display member configured to display an image, and a touch driver connected with the display member. The touch driver may include a touch driving circuit. The touch driving circuit may include a piezoelectric member including a piezoelectric material, a force sensing part connected with the piezoelectric member to sense a force based on a strain of the piezoelectric member, a vibration driver configured to generate a vibration driving signal which controls vibration generation driving of the piezoelectric member, and a controller configured to control the force sensing part and the vibration driver. The vibration generation driving of the vibration driver may be controlled based on a force sensing signal of the force sensing part.

According to various aspects of the present disclosure, the touch driver may sense at least one of a touch and a pressure of the display member.

According to various aspects of the present disclosure, the touch driver may sense at least one of the touch and the pressure of the display member and may provide a haptic feedback vibration to the display member, based on at least one of the touch and the pressure.

According to various aspects of the present disclosure, the display member may include a display panel including a plurality of pixels configured to display the image, and at least one piezoelectric member connected with a rear surface of the display panel.

According to various aspects of the present disclosure, the display member may further include a touch panel connected with the display panel to sense a touch.

According to various aspects of the present disclosure, the display panel may include a plurality of areas. The at least one piezoelectric member may include a plurality of piezoelectric members respectively disposed in the plurality of areas. The touch driver may individually control each of the plurality of piezoelectric members.

A touch driving circuit according to an aspect of the present disclosure may be applied to or included in a touch driving circuit provided in the display apparatus. The display apparatus according to an aspect of the present disclosure may be applied to or included in mobile apparatuses, video phones, smart watches, watch phones, wearable apparatuses, foldable apparatuses, rollable apparatuses, bendable apparatuses, flexible apparatuses, curved apparatuses, sliding apparatus, variable apparatus, electronic organizers, electronic book, portable multimedia players (PMPs), personal digital assistants (PDAs), MP3 players, mobile medical apparatuses, desktop personal computers (PCs), laptop PCs, netbook computers, workstations, navigation apparatuses, automotive navigation apparatuses, automotive display apparatuses, automotive apparatuses, theatre apparatuses, theatre display apparatuses, televisions (TVs), wall paper display apparatuses, signage apparatuses, game machines, notebook computers, monitors, cameras, camcorders, home appliances, etc.

It will be apparent to those skilled in the art that various modifications and variations can be made in the touch driving circuit and the display apparatus including the same of the present disclosure without departing from the technical idea or scope of the disclosure. Thus, it is intended that the present disclosure cover the modifications and variations of this disclosure provided they come within the scope of the appended claims and their equivalents.

What is claimed is:

1. A touch driving circuit, comprising:

a touch sensing part configured to sense a touch;

a force sensing part configured to sense a force;

a piezoelectric member including a piezoelectric material;

a vibration driver configured to generate a vibration driving signal, based on at least one of the touch sensing signal and the force sensing signal, and provide the vibration driving signal to the piezoelectric member;

a switching circuit part between the piezoelectric member and each of the force sensing part and the vibration driver; and a controller configured to control the switching circuit part to drive the force sensing part and the vibration driver, wherein force sensing driving of the force sensing part is controlled based on a touch sensing signal of the touch sensing part, wherein the force sensing part is configured to sense a force sensing signal based on a strain of the piezoelectric member, wherein the force sensing part is driven in a first force sensing mode or a second force sensing mode, based on the touch sensing signal, and wherein the vibration driver is driven in a first vibration standby mode or a second vibration standby mode, based on the touch sensing signal.

2. The touch driving circuit of claim 1, wherein a driving frequency of the first force sensing mode differs from a driving frequency of the second force sensing mode, or is lower than a driving frequency of the second force sensing mode.

3. The touch driving circuit of claim 2, wherein a driving frequency of the first force sensing mode is lower than a driving frequency of the second force sensing mode.

4. The touch driving circuit of claim 2, wherein the driving frequency is a sampling frequency of an analog-to-digital converter included in the force sensing part.

5. The touch driving circuit of claim 1, wherein the force sensing part does not transfer a force sensing signal in the first force sensing mode.

6. The touch driving circuit of claim 1, wherein the force sensing part transfers a force sensing signal in the second force sensing mode.

7. The touch driving circuit of claim 1, wherein the controller is configured to control the touch sensing part to an activation mode or a deactivation mode, based on the touch sensing signal.

8. The touch driving circuit of claim 7, wherein, in the second force sensing mode, the force sensing part is changed to the first force sensing mode after the touch sensing part is changed to the deactivation mode.

9. The touch driving circuit of claim 8, wherein the force sensing part is changed to the first force sensing mode after a certain time elapses after the touch sensing part is changed to the deactivation mode.

10. The touch driving circuit of claim 9, wherein the certain time is counted from a time at which the touch sensing part is changed to the deactivation mode.

11. The touch driving circuit of claim 7, wherein, in the second force sensing mode, when the touch sensing part is changed to the activation mode within a certain time after the touch sensing part is changed to the deactivation mode, the force sensing part maintains the second force sensing mode.

12. The touch driving circuit of claim 11, wherein the certain time is counted from a time at which the touch sensing part is changed to the deactivation mode.

13. The touch driving circuit of claim 1, wherein, in the second force sensing mode, the force sensing part determines whether to transfer a force sensing signal, based on the touch sensing signal of the touch sensing part.

14. The touch driving circuit of claim 1, wherein the force sensing part maintains the second force sensing mode, based on the touch sensing signal of the touch sensing part.

15. The touch driving circuit of claim 1, wherein the force sensing part receives the touch sensing signal from the touch sensing part.

16. The touch driving circuit of claim 1, wherein the controller is configured to control the touch sensing part and the force sensing part, and wherein the force sensing part receives the touch sensing signal from the controller.

17. The touch driving circuit of claim 1, wherein the force sensing part receives a data packet, including the touch sensing signal through a communication interface.

18. The touch driving circuit of claim 1, wherein the force sensing part and the vibration driver are time-divisionally driven.

19. The touch driving circuit of claim 1, wherein the controller is configured to control the switching circuit part to selectively connect the force sensing part and the vibration driver with the piezoelectric member.

20. The touch driving circuit of claim 1, wherein the first force sensing mode overlaps the first vibration standby mode.

21. The touch driving circuit of claim 1, wherein the second force sensing mode overlaps the second vibration standby mode.

22. The touch driving circuit of claim 1, wherein the vibration driver comprises a vibration driving mode which outputs the vibration driving signal, based on the force sensing signal, and wherein the force sensing driving of the force sensing part stops in the vibration driving mode of the vibration driver.

23. The touch driving circuit of claim 22, wherein, as the force sensing signal is greater than a threshold value, the vibration driver is changed from the second vibration standby mode to the vibration driving mode, and wherein the force sensing driving of the force sensing part stops in synchronization with changing of the vibration driving mode.

24. The touch driving circuit of claim 23, wherein the vibration driver is changed to the second vibration standby mode after the vibration driving mode is completed, and wherein the force sensing part is changed to the second force sensing mode in synchronization with changing of the second vibration standby mode.

25. The touch driving circuit of claim 24, wherein, in the second force sensing mode, the force sensing part is changed to the first force sensing mode after the touch sensing part is changed to the deactivation mode, based on the touch sensing signal, and wherein the vibration driver is changed to the first vibration standby mode in synchronization with changing of the first force sensing mode.

26. The touch driving circuit of claim 25, wherein, in the second force sensing mode, when the touch sensing part is changed to the activation mode within a certain time after the touch sensing part is changed to the deactivation mode, the force sensing part maintains the second force sensing mode, and wherein the vibration driver maintains the second vibration standby mode.

27. A display apparatus, comprising:

a display member configured to display an image; and a touch driver connected with the display member, wherein the touch driver comprises a touch driving circuit, wherein the touch driving circuit comprises:

a touch sensing part configured to sense a touch;

a force sensing part configured to sense a force;

a piezoelectric member including a piezoelectric material;

a vibration driver configured to generate a vibration driving signal, based on at least one of the touch sensing signal and the force sensing signal, and provide the vibration driving signal to the piezoelectric member;

a switching circuit part between the piezoelectric member and each of the force sensing part and the vibration driver; and a controller configured to control the touch sensing part and the force sensing part, wherein force sensing driving of the force sensing part is controlled based on a touch sensing signal of the touch sensing part, wherein the controller is configured to control the switching circuit part to drive the force sensing part and the vibration driver, wherein the force sensing part is configured to sense a force sensing signal based on a strain of the piezoelectric member, wherein the force sensing part is driven in a first force sensing mode or a second force sensing mode, based on the touch sensing signal, and wherein the vibration driver is driven in a first vibration standby mode or a second vibration standby mode, based on the touch sensing signal.

28. The display apparatus of claim 27, wherein the touch driver senses at least one of a touch and a pressure of the display member.

29. The display apparatus of claim 27, wherein the touch driver senses at least one of the touch and the pressure of the display member and provides a haptic feedback vibration to the display member, based on at least one of the touch and the pressure.

30. The display apparatus of claim 27, wherein the display member comprises:

a display panel including a plurality of pixels configured to display the image; and at least one piezoelectric member connected with a rear surface of the display panel.

31. The display apparatus of claim 30, wherein the display member further comprises a touch panel connected with the display panel to sense a touch.

32. The display apparatus of claim 30, wherein the display panel comprises a plurality of areas, wherein the at least one piezoelectric member comprises a plurality of piezoelectric members respectively disposed in the plurality of areas, and wherein the touch driver individually controls each of the plurality of piezoelectric members.

* * * * *